United States Patent [19]

Yamada et al.

[11] Patent Number: 4,774,401
[45] Date of Patent: Sep. 27, 1988

[54] LIGHT MEASURING DEVICE VARIABLY CONTROLLED ACCORDING TO FOCUS MODE SELECTION

[75] Inventors: Akira Yamada; Yoshihiko Aihara; Shuichi Kiyohara; Shingo Hayakawa, all of Kanagawa, Japan

[73] Assignee: Canon Kabushiki Kaisha, Tokyo, Japan

[21] Appl. No.: 894,613

[22] Filed: Aug. 8, 1986

[30] Foreign Application Priority Data

Aug. 8, 1985 [JP] Japan ................... 60-175301

[51] Int. Cl.$^4$ .............................. G01J 1/20
[52] U.S. Cl. ..................... 250/201; 250/214 P; 354/432
[58] Field of Search ............... 250/201, 204, 208, 209, 250/214 P; 356/222; 354/429, 432, 433, 402

[56] References Cited

U.S. PATENT DOCUMENTS 4,476,383 10/1984 Fukuhara et al. .............. 250/214 P
4,652,109 3/1987 Tsunekawa ..................... 354/432

Primary Examiner—David C. Nelms
Attorney, Agent, or Firm—Fitzpatrick, Cella, Harper & Scinto

[57] ABSTRACT

A light measuring device having an automatic focus control mechanism including one-shot type focus control means for effecting focus control in one-shot type focus control mode and servo type focus control means for effecting focus control in servo type focus control mode, in which a field to be photographed is divided into a plurality of areas which are subjected to light-measurement, and a control circuit is provided to vary weighting for light-measurement of these divided areas according to the selection of the above-mentioned focus control mode effected by said automatic focus control mechanism.

28 Claims, 13 Drawing Sheets

SPD1 SPD2 SPD3 SPD4

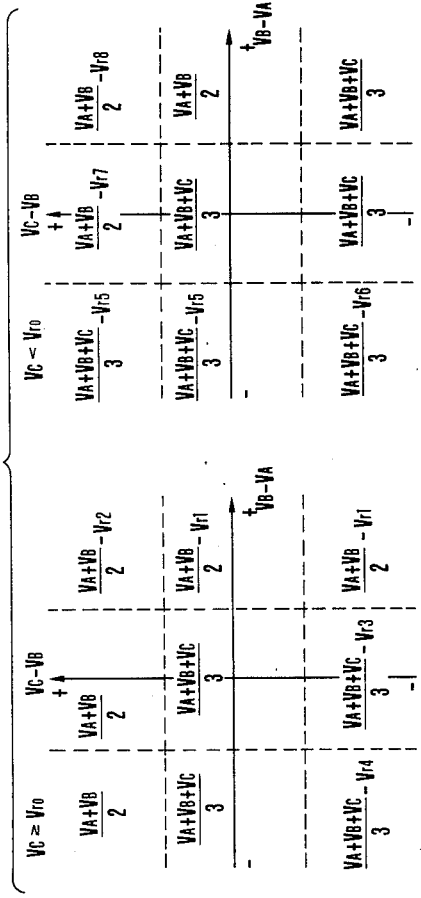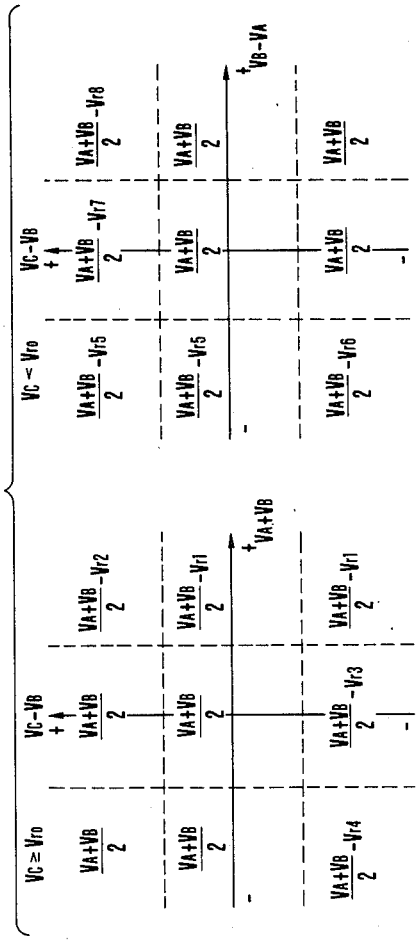

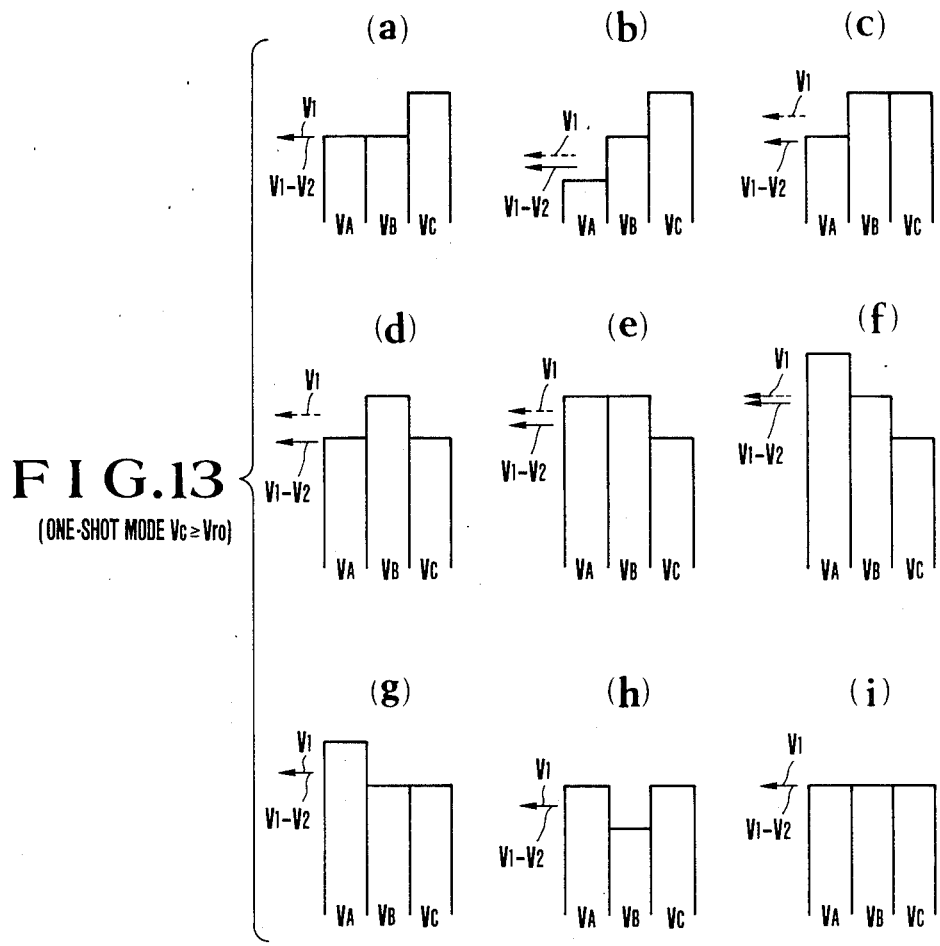
FIG.13 (ONE-SHOT MODE Vc ≥ Vro)

(ONE-SHOT MODE Vc < Vro)

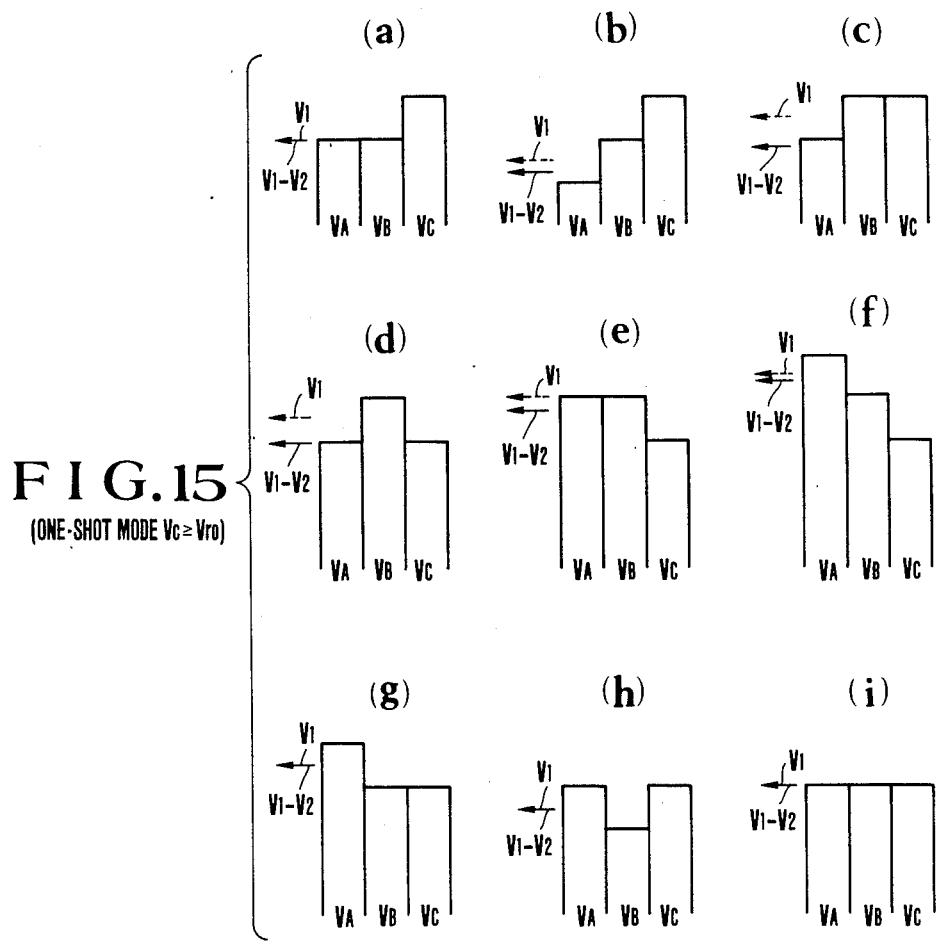
FIG. 15 (ONE-SHOT MODE $V_C \geq V_{r0}$)

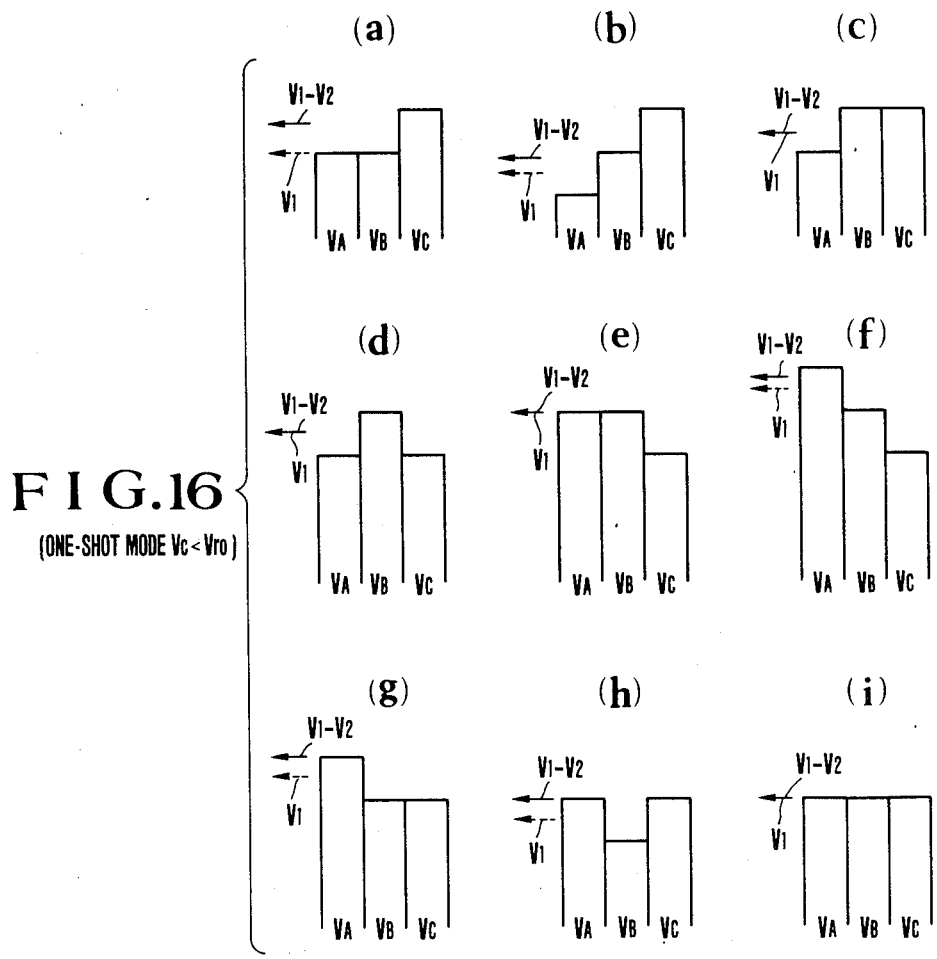
FIG.16 (ONE-SHOT MODE Vc < Vro)

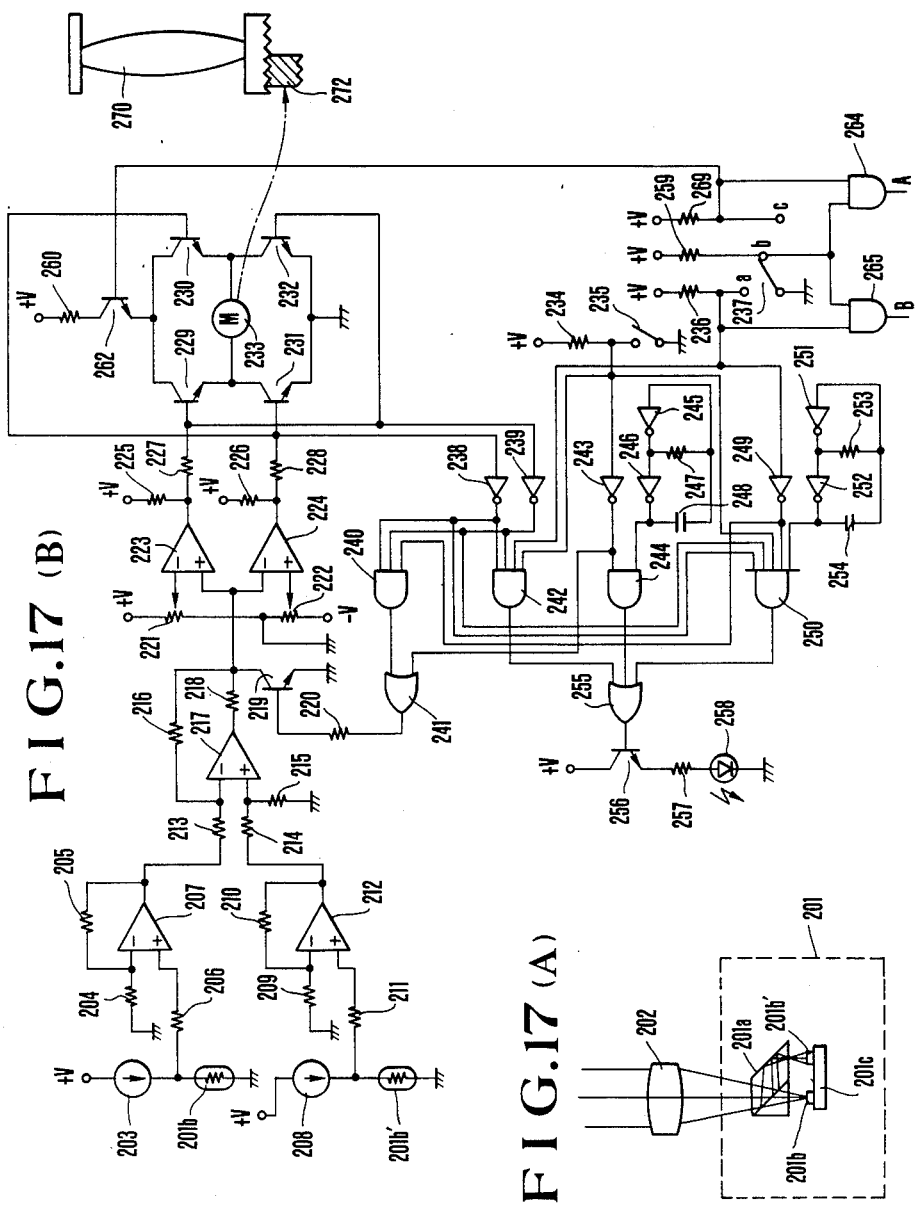

LIGHT MEASURING DEVICE VARIABLY CONTROLLED ACCORDING TO FOCUS MODE SELECTION

BACKGROUND OF THE INVENTION

1. Field of the Invention

The present invention relates to a light measuring device having an automatic focus control mechanism including one-shot type focus control means for effecting focus control in one-shot type focus control mode and servo type focus control means for effecting focus control in servo type focus control mode, in which a field to be photographed is divided into a plurality of areas which are subjected to light-measurement.

2. Description of the Related Art

Recently, a plurality of types of camera provided with an automatic focussing mechanism (hereinafter, referred to as AF) have become widely used. The AF control mode now employed in the camera of this kind can be classified into servo type focus control mode (hereinafter referred to as "servo mode") and one-shot type focus control mode (hereinafter referred to as "one-shot mode"). According to the servo mode, a photographing lens is always focussed onto an object to be photographed by the action of the AF so long as a power is supplied to the AF (for example, in the state where a releasing button is held pushed to its first stroke) and if the object has moved the photographing lens is automatically operated so that the photographing lens becomes focussed again onto the object moved. Accordingly, the servo mode is suitable to take a photograph of a moving object which moves within a distance measuring range of the camera.

On the other hand, according to the one-shot mode, a photographing lens is operated by the AF so that it is focussed onto an object to be photographed when a power is supplied to the AF, but even if the object moves after the lens has been once focussed onto the object by the AF, the photographing lens is not operated. In order to attain the focussing, it is required to release and reset the power. That is, the lens is focussed onto the object only one time after starting the operation of the AF. Accordingly, the one-shot mode is suitable to take a still photograph of person, scenery, souvenier picture, close-up picture or the like.

There are various types of light measuring system now employed in a camera, which include a center-weighted measuring type, an average measuring type, a partial measuring type, a spot measuring type, a divided measuring type, an estimated measuring type and the like. Any one of these various types of the light measuring system can be selected by a photographer as he desires. The existence of such various types of the AF mode and various types of the light measuring system, which can be selectively used by the photographer, is considerably advantageous to a skilled photographer but it is rather inconvenient to a beginner since the operation of the camera is complicated and troublesome so that he may make erroneous operation.

The estimated measuring method as mentioned above is a light measuring system which includes dividing a field to be photographed into a plurality of areas, effecting light-measurement of the respective areas and selecting particular arithmetic equatron from a plurality of arithmetic equations for light-measurement on the basis of luminance difference informations or the like at the respective divided areas to find a proper light measurement value.

When this estimated light measuring method is employed, there arises such disadvantage that a value of light measurement found by the predetermined process may not fully match with the AF mode as selected.

SUMMARY OF THE INVENTION

It is an object of the present invention to provide a light measuring device which can find a proper value of light measurement, depending upon the AF mode as selected.

BRIEF DESCRIPTION OF THE DRAWINGS

FIG. 1 illustrates an optical which the second embodiment of the present invention is applied to a single-lens reflex camera.

FIGS. 11 and 12 are diagrams for explaining arithmetic equations for light-measurement selected in the device shown in FIG. 7.

FIGS. 13(a)–13(i), 14(a)–14(i), 15(a)–15(i) and 16(a)–16(i) are diagrams for explaining levels of light-measurement found by the arithmetic equations for light-measurement selected in the device shown in FIG. 7.

FIGS. 17(A) and 17(B) illustrates an example of AF control circuit shown in FIG. 7, in which FIG. 17(A) is a diagram showing a focus detecting unit and FIG. 17(B) is a circuit diagram.

DETAILED DESCRIPTION OF THE PREFERRED EMBODIMENTS

Now, the preferred embodiments of the present invention will be explained, with reference to accompanying drawings.

Figure 1:
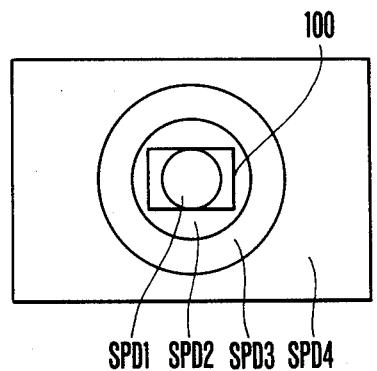
FIG. 1 is a plan view showing an arrangement of a light sensor on a picture plane according to a first embodiment of the present invention.
Figure 3:
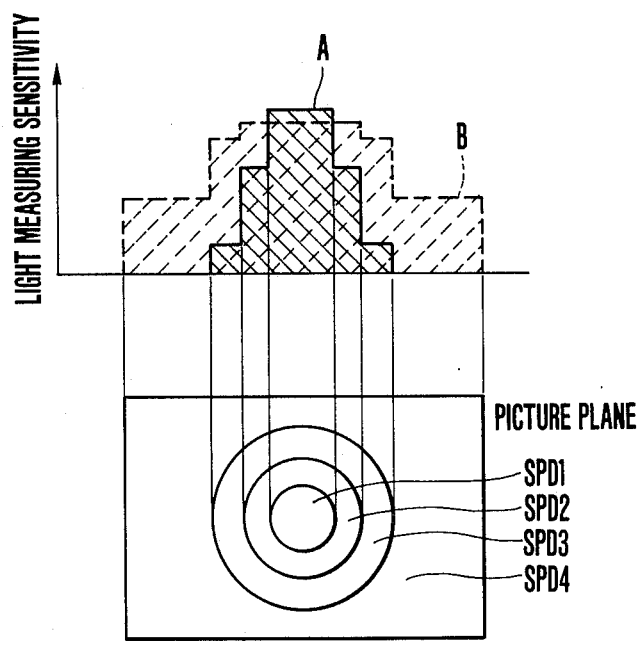
FIG. 3 is a diagram showing weighting for light measurement in the operation of the circuit.

FIG. 1 is a plan view showing an arrangement of a light dividing and receiving sensor, or measuring a luminance of an object to be photographed, according to the first embodiment of the present invention. As shown, the picture plane is divided into a plurality of areas. In the embodiment shown in FIG. 1, the light sensor includes silicon photo-diodes SPD1–SPD3, which divide a central portion of a picture plane into three concentric parts, and a silicon photo-diode SPD4 which is arranged around said central portion and thus this light sensor includes four light measuring areas. 100 indicates a distance measuring area.

Figure 2:
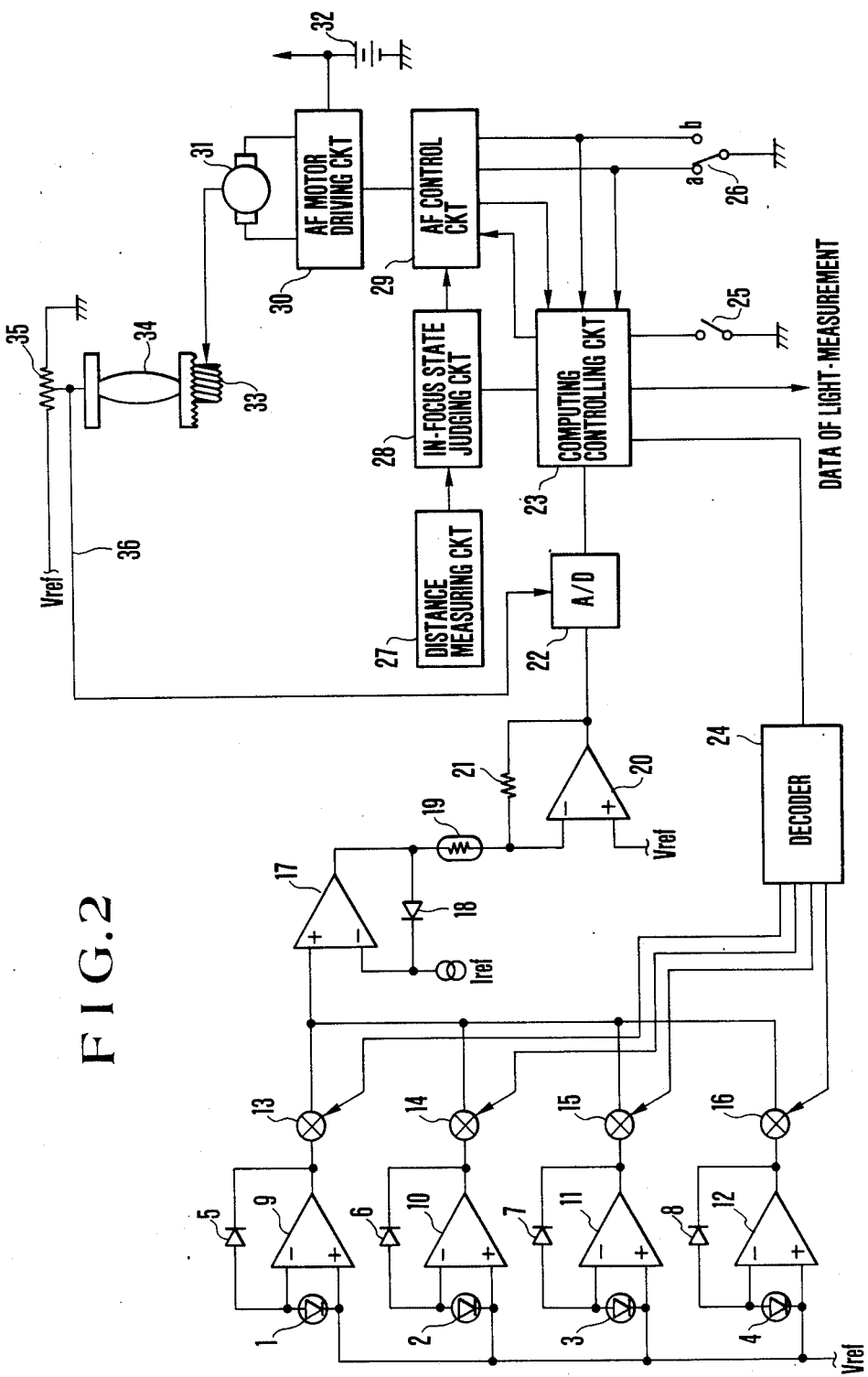
FIG. 2 is a circuit diagram showing a light measuring device according to the first embodiment of the present invention.

FIG. 2 shows a circuit of the light measuring device according to the first embodiment of the present invention. In FIG. 2, 1-4 are silicon photo-diodes, which correspond to the silicon photo-diodes SPD1-SPD4 as shown in FIG. 1, respectively. 5-8 are silicon diodes and 9-12 are operational amplifiers 9-12. Said silicon diodes 5-8 and said operational amplifiers 9-12 constitute logarithmic compression amplifiers which effect logarithmic compression, current input-voltage output, of the output currents of the four silicon photo-diodes 1-4. 13-16 are analog switches which are made conductive or non-conductive depending upon signals fed from a decoder 24. 17 is an operational amplifier, 18 is a silicon diode and 19 is a temperature compensating resistor 19 having a temperature coefficient for effecting temperature compensating or said diodes 5-8 and said silicon diode 18. 20 is an amplifier and 21 is a resistor. Said resistors 19 and 21 and the operational amplifier 20 constitute a circuit to effect the analog operation. 22 is an A/D converter, 23 is a computing and controlling circuit, and 24 is a decoder which serves to selectively operate the analog switches 13-16, depending upon signals fed from said computing and controlling circuit 23. 25 is a switch which is turned on by a first stroke of a push button of a camera. 26 is an AF control mode selecting switch which serves to select the servo mode at its position a and the one-shot mode at its position b. 27 is a distance measuring circuit which consists of a distance measuring image-sensor, etc. and produces an output signal corresponding to a focussing state, namely, in-focus, fore-focus or after-focus state. 28 is an in-focus state judging circuit, and 29 is an AF control circuit for controlling position of the photographing lens. 30 is an AF motor driving circuit, and 31 is a lens driving motor for driving a gear 33 to drive an optical system 34. 32 is a power source of the camera. A resistance element 35 is fixed on a lens barrel of the photographing lens and a slider 36 is fixed to a distance ring of the photographing lens. Said slider 36 makes sliding movement on the resistance element 35 in accordance with the movement of the distance ring to vary voltage dividing ratio Vref.

The operation of the circuit as described above will be explained.

Firstly the servo mode selected by setting the AF mode selecting switch 26 to the position a will be explained. When the release button of the camera is pushed and the switch 25 is closed by the first stroke of said release button, the computing and controlling circuit 23 gives an instruction to the AF control circuit 29 to start its AF operation. Then, the distance measuring circuit 27 functions to detect a distance of the object from the camera and feeds a distance information to the in-focus state judging circuit 28. A voltage division corresponding to the position of the distance ring is converted into a digital signal by the A/D converter 22 and fed through the computing and controlling circuit 23 to the in-focus state judging circuit 28. An amount of out-of-focus is decided by the in-focus state judging circuit 28 on the basis of the distance information detected by the distance measuring circuit 27 and the position information of the distance ring at this time, and then the arithmeric operation is effected by the AF control circuit 29, which controls the rotating direction and speed of the lens driving motor 31 through the AF motor driving circuit 30 to cause the photographing lens to come into in-focus state with a main object to be photographed at the center of the picture plane.

When the distance ring arrived at the in-focus position, the in-focus state judging circuit 28 decides that the lens is in in-focus state and such information is transmitted through the AF control circuit to the computing and controlling circuit 23. At thrs time, the servo mode is selected as the AF control mode. Under the circumstances, if the object to be photographed moves, the AF control circuit 29 is reset and the lens driving motor 31 is operated to drive the lens so that it becomes into in-focus state to the object at the moved position. When the in-focus information is transmitted from the AF control circuit 29 to the computing and controlling circuit 23 under the state where the AF control mode is set at the servo mode as described above, the computing and controlling circuit 23 acts to close the analog switch 13 and open the analog switches 14, 15 and 16 through the decoder 24. Thus, the photoelectric current delivered from the silicon photo-diode 1, which corresponds to the silicon photo-diode SPD1 in FIG. 1, is subjected to the logarithmic compression and appears at the output terminal of the operational amplifier 9 in the form of a voltage, whcch is fed into the positive phase input terminal of the operational amplifier 17. The silicon diode 18 is connected between the reverse-phase input terminal and the output terminal of said operational amplifier 17 and a constant current source Iref is connected to the cathode of said silicon diode 18 which is connected to the reverse-phase input terminal of the operational amplifier 17, so that a constant current passes through the silicon diode 18 in forward direction. These operational amplifier 17, silicon diode 18 and constant current source Iref function to compensate for an error in voltage at the output of the operational amplifier 9 which may be caused by a saturation current in reverse direction of the silicon diode 5 for logarithmic compression. The output terminal of the operational amplifier 17 is connected to the analog operation unit formed by the resistors 19 and 21 and the operational amplifier 20. This analog operation unit functions to make temperature compensation of the silicon diodes 5 and 18, by the temperature coefficient of the resistor 18. The output voltage of the operational amplifier 20 is converted by the A/D converter 22 into digital signal and is stored in the computing and controlling circuit 23 as a luminance signal of the area of the silicon photo-diode SPD1. Then, the computing and controlling circuit 23 acts to close the analog switch 14 and open the analog switches 13, 15 and 16, through the decoder 24. The photoelectric current produced by the silicon photo-diode 2, which corresponds to the silicon photo-diode SPD2 in FIG. 1, is subjected to the logarithmic compression and appears at the output terminal of the operational amplifier 10 in the form of a voltage. This voltage is applied through the analog switch 14 to the positive phase input terminal of the operational amplifier 17, and it is stored in the computing and controlling circuit 23 as a luminance information of the area of the silicon photo-diode SPD2, in the same manner as described above. The luminance informations of the silicon photo-diodes SPD3 and SPD4 are stored in the same manner.

The servo mode was selected by the automatic focus mode switch. Accordingly, as the luminance informations of the respective light-measuring areas of the object to be photographed are stored in the computing and controlling circuit 23, said circuit functions to effect weighting operation of the respective luminance informations to produce the light-measuring sensitivity distribution at central portion, as shown by solid line in FIG. 3. As an example, the luminance informations at the areas of the silicon photo-diodes SPD1–SPD4 are assumed to be BV1–BV4, respectively. Using only the luminance informations at the concentric light-measuring areas at the central portion, the arithmetic operation is effected to find a light-measurement value BV according to the following equation:

$$BV=\{(BV1)\times 5.5+(BV2)\times 3.5+(BV3)\times 1+(BV4)\times 0\}/10$$

This light-measurement value is delivered as a light-measurement data output which is used to effect automatic exposure control of a camera.

If an object to be photographed moves, the AF control circuit 29 will be reset, while at the same time the light-measurement value will be also reset. Thus the focussing operation is effected again and then the light measuring and computing operation as described above will be repeated.

Then, a description will be given to the one-shot mode which is set by operating the automatic focus control mode switch to the position b. In the same manner as described above, the luminance informations of the object to be photographed at the respec measuring areas (SPD1–SPD4) are stored in the computing an controlling circuit 23, after the lens has been driven into in-focus state. Then an arithmetic operation for weighting the luminance informations at the respective areas is effected to produce the centrally-weighted average measuring sensitivity distribution as shown by broken line B in FIG. 3. In the case shown in FIG. 3, for example, the arithmetic operation is effected, using not only the luminance informations at the central portion but also those at the peripheral portion, according to the following equation to find a light-measurement value:

$$BV=\{(BV1)\times 5.5+(BV2)\times 5+(BV3)4.5+(BV4)\times 2.5\}/17.5$$

The light-measurement value is delivered as a light-measurement data output used to effect automatic exposure control of the camera. It is not necessary to fix the arethmetic weighting operation, and the weighting coefficients concerning the respective luminance informations may be changed, in view of the respective luminance informations (SPD1–SPD4), maximum luminances, minimum luminances, luminance-differences, distance information from the photographing lens to the object to be photographed and focal length information.

It is noted that the photographing lens is held stationary even if the object to be photographed moves. It is more convenient in practical use that the light-measurement value found by the arithmetic operation is also held while the switch 25 is held ON.

A characteristic feature of the above-mentioned embodiment resides in the fact that the variation of weighting of light-measurement at the central portion of the picture plane corresponding to the distance measuring area 100 (FIG. 1) can be automatically effected according to the selection of the AF mode. In case where the servo mode was selected, the distance measuring area, that is the central portion, is subjected to more weighting than the case where the one-shot mode was selected, so that a proper exposure value is found while giving particular importance on an object existing within the distance measuring area as compared with the whole area of the picture plane, to comply with requirements in photographing a main object which is in general positioned in the distance measuring area of the picture plane.

Figure 4:
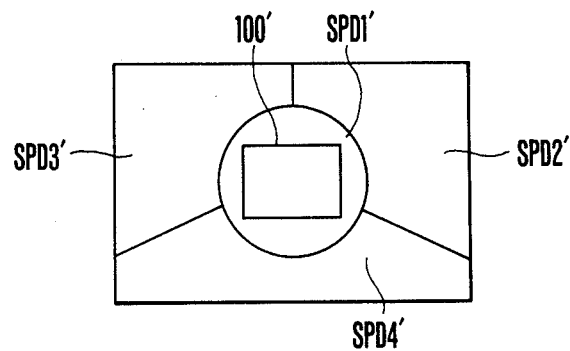
FIG. 4 is a plan view showing an arrangement of a light sensor on a picture plane according to a second embodiment of the present invention.

FIG. 4 shows an arrangement of a light receiving sensor for light measurement according to the second embodiment of the present invention. This sensor includes a silicon photo-diode SPD1' arranged at the central portion of the picture plane and three silicon photo-diodes SPD2'–SPD4' arranged around the sililcon photo-diode SPD1'.

The light receivng sensor as shown in FIG. 4 is operated by the circuit as shown in FIG. 2, in the same manner as in the above-mentioned embodiment. In this arrangement, when the one-shot mode was selected as the AF mode, the computing and controlling circuit 23 functions to deliver light-measurement data output according to a predetermined algorithm.

Next, a more detailed description will be given to this embodiment. Firstly, it is assumed that the servo mode was selected as the AF mode. In this case it is, of course, considered that an object to be photographed is in general positioned at the central distance measuring area 100' and, accordingly, a particular weighting of light-measurement is applied to the output of the central silicon photo-diode SPD1' among the silicon photo-diodes SPD1'–SPD4' so that a proper exposure value is found at the distance measuring area 100' of the object to be photographed. The operation is same as that of the above-mentioned embodiment and the detailed explanation will be omitted.

Nextly, the case where the one-shot mode was selected will be explained. When the light-measurement values of the respective silicon photo-diodes SPD1'–SPD4' were detected, the luminance differences of the respective diodes SPD1'–SPD4' are computed by the computing and controlling circuit 23 and then a light-measurement value providing proper exposure is found by arithmetic operation of the luminance-difference values in accordance with a predetermined algorithm. This measurement is generally called as estimated light measuring method. Basically this algorithm aims at providing a proper exposure value on the basis of the differences between the luminance of the central portion of the picture plane, that is the output of the silicon photo-diode SPD1', and the luminances of the peripheral portions, that is the outputs of the silicon photo-diodes SPD2'–SPD4'. For example, in case where an object having high luminance, such as sky, exists in the background of a main object to be photographed, if the exposure value was decided on the basis of the average light-measurement value the exposure time for the main object would be lower than a proper value. In such case the average light-measurement value is corrected to a positive side, to provide a proper exposure value for the whole field including the central and peripheral portions. Conversely, if a spot light is applied to the central portion, the correction is made in the opposite direction.

With regard to the details of the algorithm as mentioned above, see Japanese Laid-Open Patent Application No. Sho 55-114916.

In the second embodiment as mentioned above, when the servo mode was selected as the AF mode, more weighting is applied to the light-measurement of the distance measuring area, that is the central portion, than the peripheral portion, so that a proper exposure value is decided while giving more importance to the object existing in the distance measuring area than the whole area of the picture plane, thereby complying with the general requirement in photographing.

Figure 5:
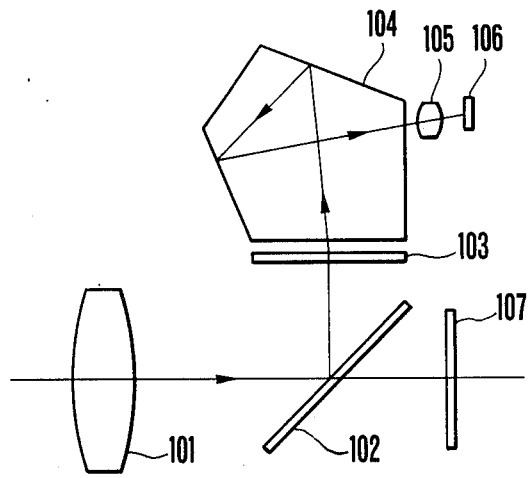

It will be understood that the embodiments as explained above function to automatically decide the weighting of light-measurement at the distance measuring area, on the basis of the photographer's intention to be considered according to the selection of the AF mode. Accordingly, there is provided a light measuring device in which a proper exposure value can be obtained without requiring complicated operation to be by the FIG. 5 shows the third embodiment of the present invention. It is a diagram of an optical system in which the invention is applied to a single-lens reflex camera. In FIG. 5, 101 is a photographing lens, 102 is a quick-return mirror, 103 is a focussing plate, 104 is a penta-prism, 105 is a focussing lens, 106 is a light receiving portion and 107 is an image plane. In this embodiment, an image of an object to be photographed is focussed on the focussing plate 103 by means of the photographing lens 101 and the image focussed on the plate 103 is focussed by the focussing lens 105 onto the light receiving portion 106 and subjected to the light measurement.

Figure 6:
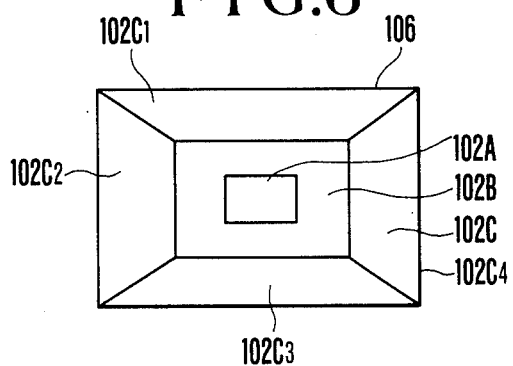
FIG. 6 is a diagram showing a light receiving face, divided into a plurality of areas, of light receiving means as shown in FIG. 5.

FIG. 6 is a diagram showing the light receiving plane of the light receiving portion 106. In FIG. 6, 102A is a substantially central area of a field to be photographed, 102B is an intermediate area surrounding said area 102A, and 102C is a peripheral area surrounding the area 102B. The area 102C is divided into four sub-areas $102C_1$–$102C_4$. The combination of the area 102A and the 102B forms a central area in this embodiment, and the area 102C forms a peripheral area. In this embodiment, a plurality of light receiving elements are arranged to receive light of the areas of the field to be photographed corresponding to the respective areas as shown in FIG. 6. Thus, the field to be photographed is divided into six areas 102A, 102B, $102C_1$–$102C_4$, which are separately subjected to light-measurement.

FIGS. 7-10 and FIG. 17 are diagrams which illustrate the circuit according to the third embodiment of the invention.

In FIG. 7, 108, 109, 110, 111, 112 and 113 indicate silicon photo-diodes (SPD) corresponding to the six areas 102A, 102B, 102C, $102C_2$, $102C_3$ and $102C_4$, respectively, to generate photoelectric currents $i_A$, $i_B$, $i_{C1}$, $i_{C2}$, $i_{C3}$ and $i_{C4}$ corresponding to the luminances of said areas, respectively. 114-119 indicate logarithmic compression circuits for applying logarithmic compression to the above photoelectric currents to produce output voltages $V_A$, $V_B$, $V_{C1}$, $V_{C2}$, $V_{C3}$ and $V_{C4}$. The voltages $V_A$, $V_B$, $V_{C1}$, $V_{C2}$, $V_{C3}$ and $V_{C4}$ can be expressed, by constants $a_1$, $a_2$, $a_3$, $a_4$, $a_5$, $a_6$ (>0), b (>0) and photoelectric currents $i_A$, $i_B$, $i_{C1}$, $i_{C2}$, $i_{C3}$ and $i_{C4}$, as follows:

$$V_A = a_1 + b \ln i_A$$

$$V_B = a_2 + b \ln i_B$$

$$V_{C1} = a_3 + b \ln i_{C1}$$

$$V_{C2} = a_4 + b \ln i_{C2}$$

$$V_{C3} = a_5 + b \ln i_{C3}$$

$$V_{C4} = a_6 + b \ln i_{C4}$$

Figure 8:
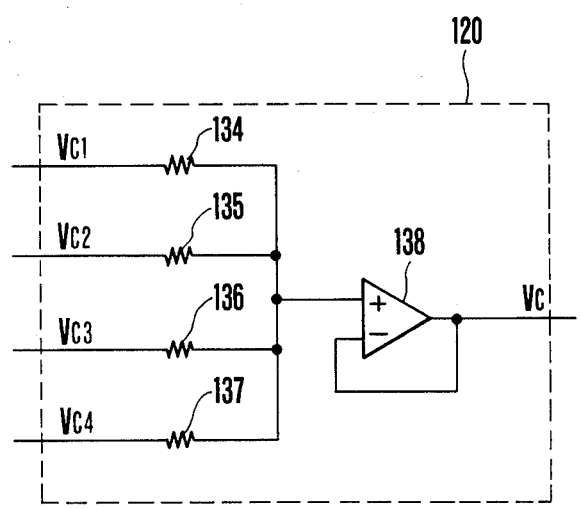
FIG. 8 is a detailed circuit diagram showing a peripheral luminance computing circuit shown in FIG. 7.

The above constants $a_1$, $a_2$, $a_3$, $a_4$, $a_5$ and $a_6$ are previously set in the logarithmic compression circuits 114-119 so that $V_A = V_B = V_{C1} = V_{C2} = V_{C3} = V_{C4}$ when the luminance valules of the respective areas are equal to each other. 120 is a peripheral-luminance value computing circuit which receives the output voltages $V_{C1}$, $V_{C2}$, $V_{C3}$, $V_{C4}$ of the logarithmic compression circuits 116-119 at its input terminals $I_{11}$, $I_{12}$, $I_{13}$ and $I_{14}$, respectively, then effects arithmetic operation of the luminance value at the outermost peripheral portion 102C of the field to be photographed and puts out the voltage $V_C$ at the output terminal $O_1$. The construction of the peripheral luminance value computing circuit 120 is shown in FIG. 8.

In FIG. 8, 134, 135, 136 and 137 are resistors having same resistance vlaue and serve to equalize the output voltages $V_{C1}$, $V_{C2}$, $V_{C3}$ and $V_{C4}$. 138 is an operational amplifier in which its output terminal is connected to its opposite phase input terminal, which is used as a voltage follower. At the output of the operational amplifier 138, a voltage equal to its positive phase input terminal voltage is put out, independently of the state of the circuit following the output terminal. The output $V_C$ of the operational amplifier 138 is:

$$V_C = (V_{C1} + V_{C2} + V_{C3} + V_{C4})/4,$$

which is put out from the output terminal $O_1$. As described above, the peripheral luminance computing circuit 120 is so arranged as to put out the average value of the luminance at the peripheral portion of the field to be photographed from the output terminal $O_1$.

Figure 7:
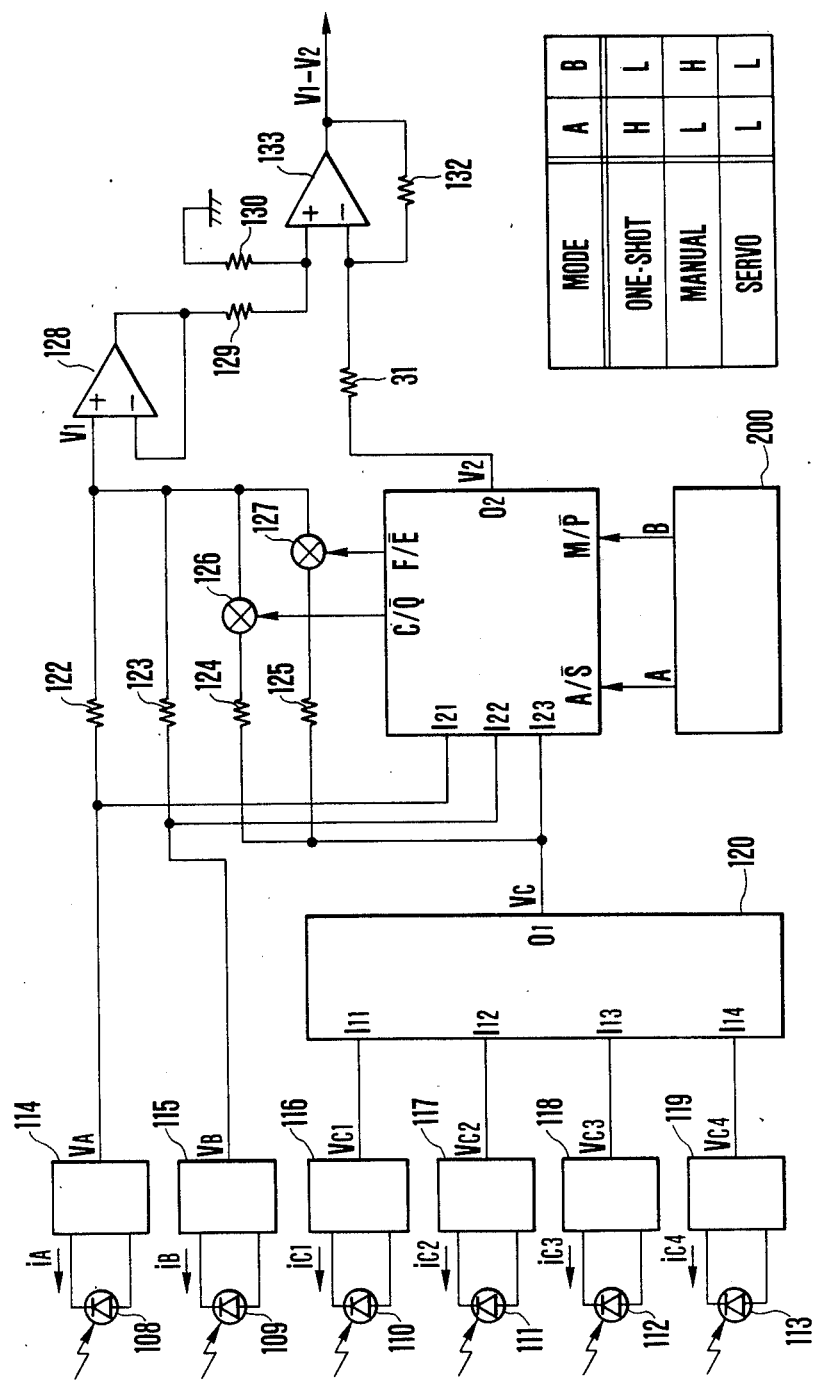
FIG. 7 is a circuit diagram showing a light measuring device according to a third embodiment of the present invention.

In FIG. 7, 121 indicates a selecting circuit which receives the output voltage $V_A$ and $V_B$ of the logarithmic compression circuits 114 and 115 and the output voltage $V_C$ of the peripheral luminance computing circuit 120 at its input terminals $I_{21}$, $I_{22}$ and $I_{23}$, respectively, and further receives signals corresponding to the various AF modes at its input terminals A/$\overline{S}$ and M/$\overline{P}$ and then decides which arithmetic equation among a plurality of arithmetic equations hereinafter described is to be selected. In FIG. 7, 122, 123 and 124 are resistors having same resistance value and 125 is a resistor having a resistance value of 1/K times as high as said resistance value (1<K). 126 and 127 are analog switches. The resistors 122, 123 and 124 and the analog switch 126 or the resistors 122, 123 and 125 and the analog switch 127 constitute an average value circuit or weighting average value circuit. The analog switches 126 and 127 have control terminals which are connected to C/$\overline{Q}$ output terminal and F/$\overline{E}$ output terminal of the selecting circuit 121, respectively, and are controlled thereby, so that the output voltage $V_1$ of the average value circuit or weighting average value circuit is decided in accordance with the level of the output voltage at the output terminal C/$\overline{Q}$ and the level of the output voltage at the output terminal F/$\overline{E}$. When the output voltage of the C/$\overline{Q}$ output terminal is at H level while the output voltage of the F/$\overline{E}$ output terminal is at L level, the analog switch 126 is in conductive state while the analog switch 27 is in open state, so that the output voltage $V_1$ of the average value circuit is $(V_A + V_B + V_C)/3$. When the output voltage of the output terminal C/$\overline{Q}$ is at L level while th output voltage of the output terminal F/$\overline{E}$ is at H level, the analog switch 126 is in open state while the analog switch 127 is in conductive state, so that the output voltage $V_1$ of the average value circuit is $(V_A+V_B+KV_C)(K+2)$. When the output voltage of the output terminal $C/\overline{Q}$ is at L level and the output voltage of the output terminal $F/\overline{E}$ is at L level, the analog switch 126 is in open state while the analog switch 127 is also in open state, so that the output voltage $V_1$ of the average value circuit is $(V_A+V_B)/2$. The selecting circuit 121 is so arranged that both output voltages of the output terminals $C/\overline{Q}$ and $F/\overline{E}$ do not become H level simultaneously. 128 is an operational amplifier in which its output terminal is connected to its opposite phase input terminal, which is used as a voltage follower. To its positive phase input terminal is fed the output voltage $V_1$ of the average value circuit. The output voltage of the operational amplifier 128 is $V_1$, independently of the state of the circuit following said output. 129, 130, 131 and 132 are resistors having same resistance value and 133 is an operational amplifier. The resistors 129, 130, 131 and 132 and the operational amplifier 133 cooperate to constitutes a substracting circuit. Assuming that the voltage at the output terminal $O_2$ of the selecting circuit 21 is $V_2$, the output voltage of this substracting circuit is $V_1-V_2$. This voltage $V_1-V_2$ expresses the light-measurement value decided by plurallity of arithmetic equations as hereinafter described.

Figure 9:
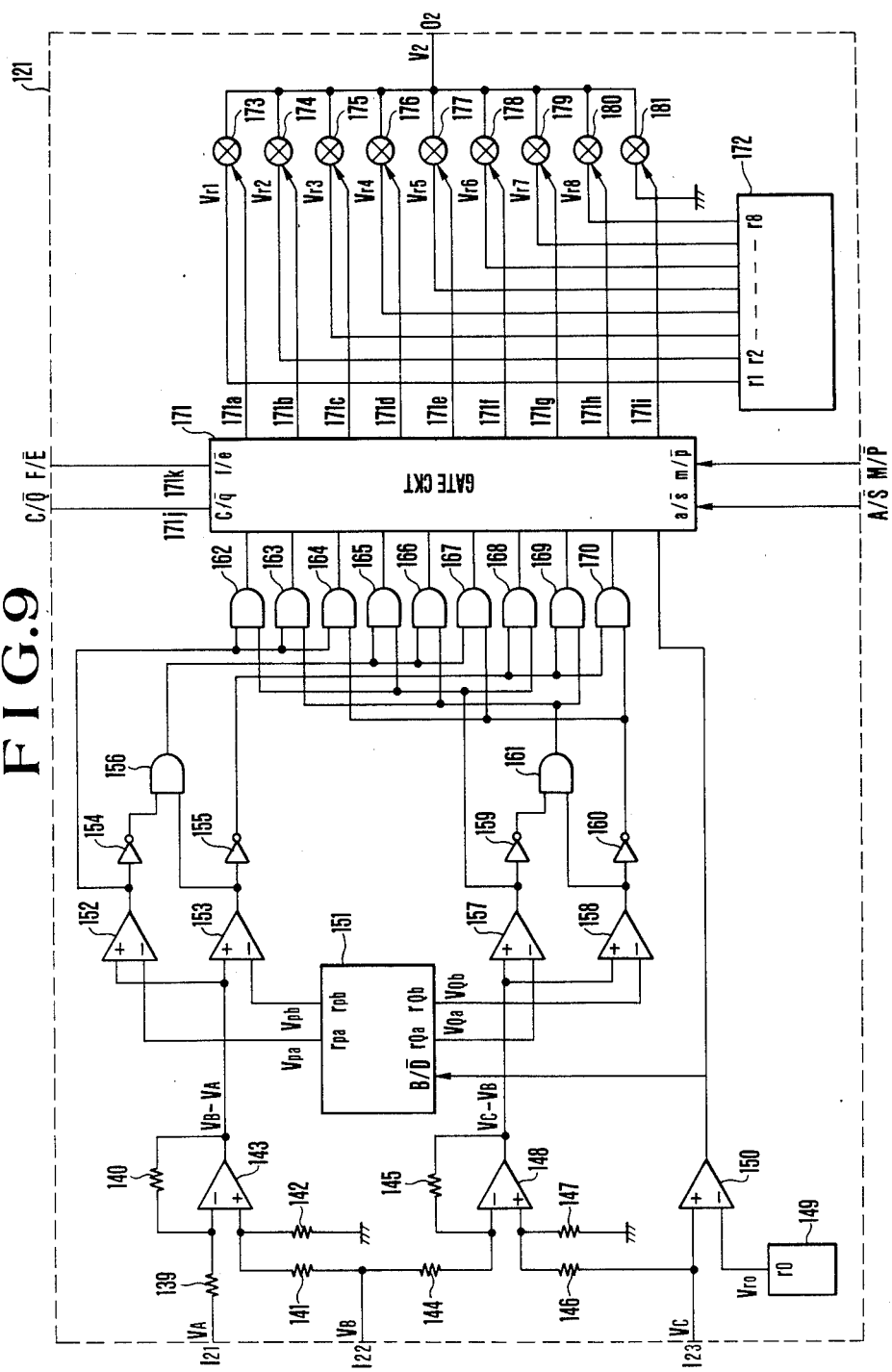
FIG. 9 is a detailed circuit diagram showing a selecting circuit shown in FIG. 7.

FIG. 9 is a circuit diagram of the selecting circuit 121 as shown in FIG. 7. In FIG. 9, a first substracting circuit is constituted by resistors 139, 140, 141 and 142 having same resistance value and an operational amplifier 143. In he same manner a second subtracting circuit is constituted by resistors 144, 145, 146 and 147 having same resistance value and an operational amplifier 148. The input voltages of the first subtracting circuit are $V_A$ and $V_B$ and the output voltage thereof is $V_C-V_B$. 149 is a reference voltage generating circuit which generates a reference voltage $V_{r0}$. 150 is a comparator which receives the voltage $V_C$ at its positive phase input terminal and the reference voltage $V_{r0}$ at its opposite phase input terminal. This comparator 150 puts out H level voltage when $V_C>V_{r0}$ and L level voltage when $V_C<V_{r0}$. 151 is a reference voltage $V_{Pa}$, $V_{Pb}$, $V_{Qa}$ and $V_{Qb}$. The reference voltage generating circuit 151 has a control terminal $B/\overline{D}$, which receives the output voltage or the comparator 150 as its control voltage. Then, it is assumed that when the control terminal $B/\overline{D}$ receives the H level control voltage, the reference voltages are: $V_{Pa}=V_{P1}$, $V_{Pb}=V_{P2}$, $V_{Qa}=V_{Q1}$ and $V_{Qb}=V_{Q2}$, and when said control terminal $B/\overline{D}$ receives the L level control voltage, the reference voltages are: $V_{Pa}=V_{p3}$, $V_{Pb}=V_{P4}$, $V_{Qa}=V_{Q3}$ and $V_{Qb}=V_{Q4}$. Referring to the signs of these reference voltages $V_{P1}$-$V_{P4}$ and $V_{Q1}$-$V_{Q4}$, the voltages $V_{P1}$, $V_{P3}$, $V_{Q1}$ and $V_{Q3}$ are positive and the voltages $V_{P2}$, $V_{P4}$, $V_{Q2}$ and $V_{Q4}$ are negative. 152 and 153 are comparators, 154 and 155 are inverters and 156 is an AND gate. To the positive phase terminals of the comparators 152 and 153 are fed the output voltage $V_B-V_A$ of the operational amplifier of the first subtracting circuit. To the opposite phase input terminal of the comparator 152 is fed the reference voltage $V_{P1}$ or the reference voltage $V_{P3}$, depending upon whether the control voltage fed to the control terminal $B/\overline{D}$ of the reference voltage generating circuit 151 is at H level or L level. To the opposite phase input terminal of the comparator 153 is fed the reference voltage $V_{P2}$ or the reference voltage $V_{P4}$ in the same manner as described above. The inputs of the inverters 154 and 155 are connected to the outputs of the comparators 152 and 153, respectively, and the two inputs of the AND gate 156 are connected to the output of the inverter 154 and the output of the comparator 153. The comparators 152 and 153, the inverters 154 and 155 and the AND gate 156 function to divide the level of the output voltage $V_B-V_A$ of the operational amplifier 143 into three stages. 157 and 158 are comparators, 159 and 160 are inverters and 161 is an AND gate. To the positive phase input terminals of the comparators 157 and 158 is fed the output voltage $V_{C-VB}$ of the operational amplifier 148 of the second subtracting circuit. To the opposite phase input terminal of the comparator 157 is fed the reference voltage $V_{Q1}$ or the reference voltage $V_{Q3}$, depending upon whether the control voltage fed into the control terminal $B/\overline{D}$ of the reference voltage generating circuit 151 is at H level or L level. To the opposite phase input terminal of the comparator 158 is fed the reference voltage $V_{Q2}$ or the reference voltage $V_{Q4}$ in the same manner as described above. The inputs of the inverters 159 and 160 are connected to the outputs of the comparators 157 and 158, respectively, and the two inputs of the AND gate 161 are connected to the output of the inverter 159 and the output of the.comparator 158. The comparators 157 and 158, the inverters 159 and 160 and the AND gate 161 function to divide the level of the output voltage $V_C-V_B$ of the operational amplifier 148 into three stages. The voltage at the output terminal of the comparator 152, 153, 157 or 158 is at H level or L level, depending upon the relation between the voltage $V+$ at the positive phase input terminal and the voltage $V-$ at the opposite phase input terminal, that is, H level voltage is produced when $V+\geq V-$, while L level is produced when $V+<V-$.

162-170 indicates AND gates. By properly combining the H level states and the L level states of the comparators 152, 153, 157 and 158, it is possible to provide an arrangement of the above AND gates 162-170 in which any one of the AND gates provides H level voltage L level voltage output. While one of the AND gates will provide H level output, depending upon the relation between $V_B-V_A$, $V_{Pa}$ and $V_{Pb}$ and the relation between $V_C-V_B$, $V_{Qa}$ and $V_{Qb}$ is as follows:

(1) $V_B - V_A \geq V_{Pa}$ (i) $V_C - V_B \geq V_{Qa}$ AND gate 162

(ii) $V_{Qa} > V_C - V_B \geq V_{Qb}$ AND gate 163

(iii) $V_{Qb} > V_C - V_B$ AND gate 164

(2) $V_{Pa} > V_B - V_A \geq V_{Pb}$ (i) $V_C - V_B \geq V_{Qa}$ AND gate 165

(ii) $V_{Qa} > V_C - V_B \geq V_{Qb}$ AND gate 166

(iii) $V_{Qb} > V_C - V_B$ AND gate 167

(3) $V_{Pb} > V_B - V_A$ (i) $V_C - V_B \geq V_{Qa}$ AND gate 168

(ii) $V_{Qa} > V_C - V_B \geq V_{Qb}$ AND gate 169

(iii) $V_{Qb} > V_C - V_B$ AND gate 170

171 indicates a gate circuit which cosists of a combination of AND gates, OR gates or the like. To this gate circuit 171 are fed the output of the comparator 150 and the outputs of the AND gates 162-170. To the input terminals $A/\overline{S}$, and $M/\overline{P}$, of the selecting circuit 121 are fed signals corresponding to respective AF modes from AF control circuit 200, as hereinafter described, to produce output signals 171a–171i and 171j, 171k for making control operations as hereinafter described. 172 indicates a reference voltage generating circuit which generates reference voltages $V_{r1}$–$V_{r2}$. These reference voltages are so determined that $V_{r1}$, $V_{r2}$, $V_{r3}$, $V_{r4} > 0$, $V_{r5}$, $V_{r6}$, $V_{r7}$, $V_{r8} < 0$, and $V_{r2} < V_{r1}$, $V_{r3} > V_{r4}$, $|V_{r6}| < |V_{r5}|$, $|V_{r7}| > |V_{r8}|$. 173—181 indicate analog switches. The analog switches 173, 174, 175, 176, 177, 178, 179 and 180 receive, at their input terminals, the reference voltages $V_{r1}$, $V_{r2}$, $V_{r3}$, $V_{r4}$, $V_{r5}$, $V_{r6}$, $V_{r7}$ and $V_{r8}$, respectively. The input terminal of the analg switch 181 is 0V. The output ends of these analog switches are connected together and put out the $V_2$ voltage at the $O_2$ output end. The analog switch 173 receives, at its control terminal, the output signal 171a of the above-described gate circuit and when said output signal 171a is at H level the analog switch 173 is made conductive so that the reference voltage $V_{r1}$ appears at the output end $O_2$. In the same manner, the analog switches 174, 175, 176, 177, 178, 179, 180 and 181 receive, at their control terminals, the output signals 171b, 171c, 171d, 171e, 171f, 171g, 171h and 171i, respectively.

The output signal 171j of said gate circuit 171 appears at the output end C/q̄ and the output signal 171k appears at the output end f/ē, so that these signals appear at the output terminals C/Q̄ and F/Ē of the selecting circuit 121, respectively, which are fed to the control terminals of the analog switches 126 and 127 as shown in FIG. 7, respectively, to decide the output voltages of the average value circuit or weighting average value circuit according to the output levels of said output signals 171j and 171k. That is, when both of 171j and 171k are at L level, both of the analog switches 126 and 127 are in open states, so that the output voltage $V_1$ is $(V_A+V_B)/2$. When 171j is at H level and 171k is at L level, the analog switch 126 is in conductive state and the analog switch 127 is in open state, so that the output voltage $V_1$ is $(V_A+V_B+V_C)/3$. When 171j is at L level and 171k is at H level, the analog switch 26 is in open state and the analog switch 127 is in conductive state, so that the output voltage $V_1$ is $(V_A+V_B+KV_C)/(K+2)$. The circuit is so arranged that both of the output signals 171j and 171k cannot be at H level at the same time.

Figure 10:
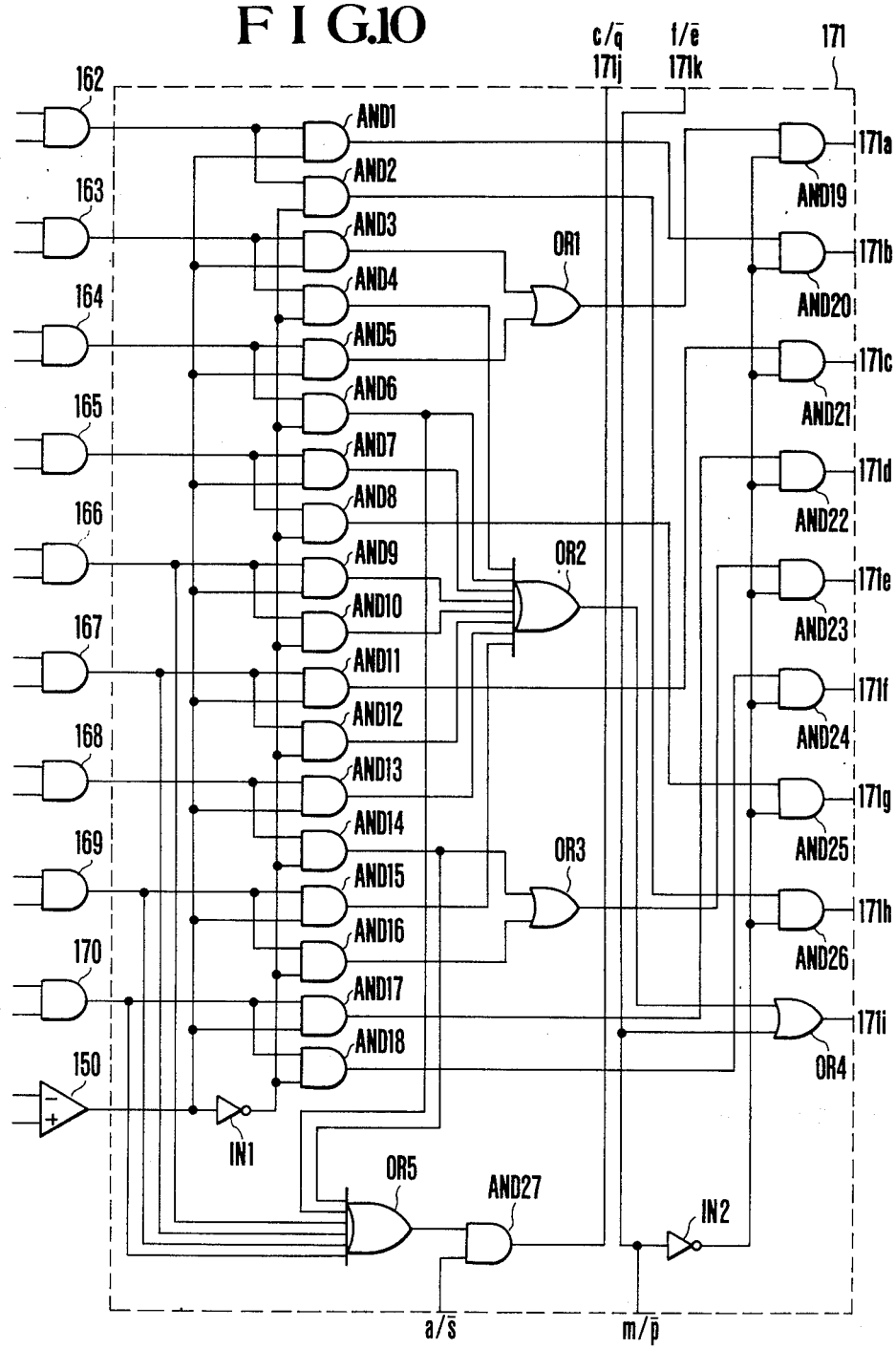
FIG. 10 is a circuit diagram showing an example of a gate circuit shown in FIG. 9.
Figure 14:
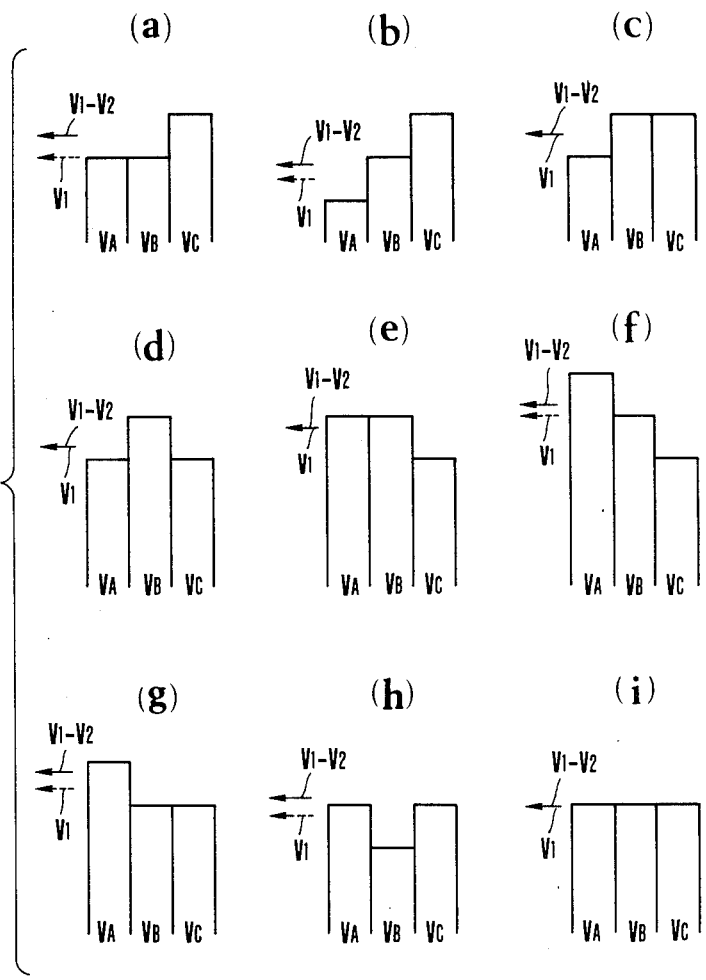

An example of the combination of AND gate, OR gate and the like which constitute the gate circuit 171 is shown in FIG. 10. The circuit shown in FIG. 10 includes AND gates AND1–AND27, OR gates OR-1–OR5, and inverters IN1 and IN2. The gate circuit 171 shown in FIG. 10 is so arranged that the output signals 171a–171i and 171j, 171k are controlled, depending upon the output signals of the AND gates 162-170, the output signal of the comparator 150 and the output signals corresponding to the respective AF modes from the input terminals a/s̄ and m/p̄, as hereinafter described. The above elements may be combined in any manner and it is to be understood that the combination as shown in FIG. 10 is a simple example of the combination.

Next, the AF control circuit 200 as shown in FIG. 7 will be explained with reference to FIG. 17.

In FIG. 17(A), 201 is a focus detecting unit, and 202 is a focus detecting relay lens. The unit 201 consists of a beam splitter 201a, a base plate 201c, and two light receiving elements 201b, 201b' disposed on said plate. Said light receiving elements 201b and 201b' are arranged at fore-focus and after-focus positions, in case of TTL distance measuring system, for example, and the images focussed on these elements have substantially same resolutions at the time of focussed state.

FIG. 17(B) is a circuit diagram in which photoelectric elements, such as CdS elements or the like, are used as the light receiving elements, so that the resolution of image is determined by the resistance value of the CdS element. In FIG. 17(B), 203 and 208 are constant voltage sources. 204–207 and 209–212 are resistors and operational amplifiers which constitute non-inversion amplifying circuits, which form sensor circuits. 213–218 are resistors and an operational amplifier which constitute a differential amplifier, and 221–226 are comparators and resistors which constitute a window comparator. The differential amplifier and the window comparator constitute a detecting circuit. 229–232 are transistors which constitute a bridge for controlling forward and reverse rotation of a motor 233, in which when the comparator 223 is at H level the transistors 229 and 232 are turned ON and when the comparator 224 is at H level the transistors 230 and 231 are turned ON. 227 and 228 are protective resistors which limit the currents passing to these transistors. The transistors constitute a drive control circuit. 234 is a resistor and 235 is an AF lock switch forming the AF lock operating member. 236 and 269 are resistors and 237 is a mode selecting switch for selecting one-shot mode, servo mode or manual mode. 238, 239, 243, 245, 246, 249, 251 and 252 are NOT gates of the logic circuit, 240, 242, 244 and 250 are AND gates, and 241 and 255 are OR gates. The input of the AND gate 240 is fed from the NOT gates 238, 239 and 249 and the input of the AND gate 242 is fed from the NOT gates 238 and 239, the AF lock switch and the mode selecting switch. An oscillating circuit is formed by NOT gates, resistor and capacitor 245–248 and another oscillating circuit is formed by NOT gates, resistor and capacitor 251–254. The values of the respective capacitors and resistors of these oscillating circuits are so set that the oscillating circuit formed by 245–248 and that formed by 251–254 have different oscillating frequencies. The input of the AND gate 244 is fed from the oscillating circuit formed by the NOT gates 243 and 245–248, and the inpt of the AND gate 250 is fed from the NOT gates 238, 239 and 249, the AF lock switch and the oscillating circuit formed by the elements 251–254. 219 is a transistor and 220 is a protective resistor, and said transistor 219 has a base connected with the resistor 220, a collector connected with a plus input of the comparator 223 and a minus input of the comparator 224 and an emitter connected with ground. The OR gate 241 is supplied with inputs from the AND gate 240 and the NOT gate 243 and the output is fed through the resistor 220 to the base of the transistor 219. The input of the OR gate 255 is supplied from the AND gates 242, 244 and 250. 256 is a transistor and 257 is a resistor, for driving a light emitting diode (LED) 258. The transistor 256 has a base connected with the OR gate 255, a collector connected with a power source and an emitter connected through a resistor 257 with the LED 258.

The above-mentioned AND gate 242 constitutes a first driving signal forming circuit for forming first driving signals, the oscillating circuit formed by 251–254 constitutes a second driving signal forming circuit for forming second driving signals, and the oscillating circuit formed by 245–248 constitutes a third driving signal forming circuit for forming third driving signals. The above-mentioned AND gates 242, 244 and 250 and the NOT gates 249, 243, 238 and 239 constitute an indicated operation controlling circuit. In FIG. 17(B), 259 and 260 are resistors, 262 is a transistor, 270 is a photographing lens, 272 is a gear, and 264 and 265 are AND gates.

In the construction as described above, the outputs of the CdS elements 201b and 201b' are fed through the non-inversion amplifiers, respectively, to the differential amplifier 217, thereby feeding a difference in resolution of images on the respective CdS elements to the window comparator. Said window comparator has threshold values set by the resistors 221 and 222, and it is assumed that the in-focus state is obtained when the above-mentioned difference in resolution falls within the range defined between the above two threshold values. That is, the resolutions of image on the CdS elements 201b and 201b' substantially coincide with each other in the in-focus state, as described above, and consequently the output of the differential amplifier 217 is substantially zero and takes a value falling within the range defined by the threshold values of the window comparator, so that the comparators 223 and 224 put out L levels.

It is now assumed that the mode selecting switch 237 was set to the servo mode side b. In such state, the differential amplifier 217 produces an output (positive, negative or zero) depending upon the difference in resolution between the CdS elements 201b and 201b. In the case other than the in-focus state, the output of the amplifier indicates positive or negative value other than the above-mentioned threshold values, so that H level is produced from one of the comparators 223 and 224. Accordingly, the motor rotation control circuit functions to rotate the motor 233 in the forward or reverse direction on the basis of the output of said comparator, whereby the gear 272 associated with the motor 233 is rotated and the photographing lens 270 is driven in focussing direction to effect focussing operation. When the photographing lens 270 has attained its in-focus state by driving said lens as described above, the differences in resolution of images on said CdS elements 201b and 201b' substantially coincide with each other, so that the output of the amplifier 217 takes a value falling within the above-mentioned range of threshold values. Both of the outputs of the comparators 223 and 224 become L level and the moto rotation control circuit for controlling the rotation of the motor 233 is made inactive, so that the lens is held in in-focus state. Furthermore, the L level signals from the comparators 223 and 224 are fed through the NOT gates 238 and 239 and become H level signals, wnich are fed into the AND gate 242. To the AND gate 242 is supplied H level signal from the power source through the resistor 234 when the AF lock switch 235 is at OFF position and H level signal from the power source 236 since the mode selecting switch is at servo mode selecting position. Accordingly, the output of the AND gate 242 becomes H level signal as a first driving signal, at the focussing time, which is fed into the OR gate 255. The output of said OR gate 255 becomes H level, so that the transistor 256 is turned ON and the LED 258 is energized to show the in-focus state.

If the object to be photographed moves, after the in-focus state has been attained, the motor 233 is rotated again in forward or reverse direction to drive the photographing lens into the in-focus position in accordance with the motion of the object. When the in-focus state has been attained, the LED 258 is energized. According to the servo mode, the LED 258, when energized, always indicates the in-focus state and the photographer can see the in-focus state.

If the AF lock switch 235 is turned ON after the in-focus state has been indicated under the servo mode, the L level signal from the switch 235 is fed through the NOT gate 243 and it becomes H level signal, which is fed into the OR gate 241 and the AND gate 244. Accordingly, the output of the OR gate 241 becomes at H level and the transistor 219 is turned ON. Thereafter, the input signal to the window comparator is locked at substantially zero level, independently of the resolution of image received by the CdS element. Thus the outputs of the comparators 223 and 224. are locked at L level and the rotation control circuit is held in inactive state. The output of the oscillating circuit constituted by 245-248 is fed through the AND gate 244 into the OR gate 255, so that the LED 258 is flashed under the action of the oscillating pulses fed from the oscillating circuit constituted by 245-248 to inform the photographer of the fact that the camera is in AF lock state.

Then it is assumed that the mode selecting switch 237 has been operated to the one-shot mode side a. The L level signal is fed to the NOT gate 249 and the output thereof becomes H level signal, which is fed into the AND gates 240 and 250. The AND gate 240 is supplied with H level signals through the NOT gates 238 and 239 when both of the output signals of the comparators 223 and 224 have become at L level, that is, when the in-focus state has been attained. At this stage, the output of said AND gate 240 becomes at H level for the first time and this output is fed into the OR gate 241, the output of which is at H level and turns ON the transistor 219. Accordingly, under the one-shot mode, the focussing is effected at the first stage in the same manner as under the servo mode but when the in-focus state has been attained the drive of the rotation control circuit is stopped. When the in-focus state has been attained, the AND gate 250 receives H 1-evel signals from the NOT gates 238 and 239, H level signal from the power source, since the AF lock switch is OFF at this stage, and H level signal from the NOT gate 249. Accordingly, the output pulse of the oscillatring circuit constituted by 251-254 is put out through the AND gate 250, as a second driving signal, and said pulse is transmitted through the OR gate 255 to the transistor 256. The LED 258 flashes according to the output pulse of the oscillating circuit constituted by 251-254, thereby indicating the fact that the in-focus state has been attained under the one-shot mode. The oscillating circuit formed by 251-254 and that formed by 245-248 are different in oscillating frequency from each other, as described above and, consequently, the photographer can clearly distinguish the indication of in-focus state according to the servo mode, the indication of in-focus state according to the one-shot mode and the indication of AF lock, on the basis of the turning-on or flashing of the LED 258.

Next, it is assumed that the mode selecting switch 237 has been operated to the manual mode side c. In this case, the differential amplifier 217 produces an output corresponding to the difference in resolution, in the same manner as in the case of the servo mode. However, the transistor 262 which can control the power supply to the motor 233 is held OFF and, therefore, said motor 233 does not rotate even in the case other than the in-focus state. Accordingly, the photographer makes focus adjustment by himself and, in other words, it is possible for the photographer to make focus-adjustment as the he dires, for example, to make a soft-focus on a main object. In this case the in-focus state can be understood by the turning-on of the LED 258.

The operating state of the above-mentioned mode selecting switch 237 is fed, from the output A of the AND gate 264 and the output B of the AND gate 265, to the selecting circuit 121 as shown in FIG. 7. That is, when the one-shot mode has been selected by the switch 237 (side a) the output A of the AND gate 264 is H level and the output B of the AND gate 265 is L level.

When the servo mode has been selected by the switch 237 (side b), the output A of the AND gate 264 is L level and the output B of the AND gate 265 is L level. When the manual mode has been selected by the switch 237 (side c), the output A of the AND gate 264 is L level and the output B of the AND gate 265 is H level.

Next, the operation of the circuits as shown in FIGS. 7-10 will be explained, with reference to FIGS. 11-16.

The input terminals A/$\overline{S}$ and M/$\overline{P}$ of the selecting circuit 121 as shown in FIG. 7 receive the voltages having following levels according to the respective focus control systems, as explained with reference to FIG. 17.

|  |  | A/$\overline{S}$ | M/$\overline{P}$ |
| --- | --- | --- | --- |
| (I) | one-shot mode | H | L |
| (II) | servo mode | L | L |
| (III) | manual mode | L | H |

The circuit is so constructed that there is no cas where both of the input terminals A/$\overline{S}$ and M/$\overline{P}$ receive H level voltages at the same time.

Now, the method of selecting an arithmetic equation for finding light-measurement values suitable for the respective modes as mentioned above and the operation of the circuits will be explained.

(I) One-Shot Mode

The one-shot mode means a focus control mode in which when the power is supplied the photographing lens is moved by the AF so that the lens is focussed with regard to the object to be photographed and even if the object moves, after focussing, the photographing lens is not moved until the power is released and reset, that is, a focus control mode in which the lens is focussed with regard to the object only one time after starting the AF. This mode is suitable to take a photograph of stationary object, such as personal photograph, scenery photograph, souvenier photograph, close-up photograph or the like.

In this mode, therefore, it is necessary to assume two cases for making light-measurement. One of them is the case where the main object such as person is disposed at the center of the picture plane when the lens has been focussed to the picture plane. The other is the case where the main object does not exist at the center of the picture plane, such as the case of taking photograph of scenery. More specifically, it is preferred to fnd the light-measurement value, while properly selecting the case where only the luminance signal at the central area of the picture plane is used to decide the light-measurement value or the case where the luminance signal of whole picture plane is used to decide the rght-measurement value, depending upon the distribution of luminance of the field to be photographed.

Next, the circuit operation will be explained. When the one-shot mode was selected, the input terminal A/$\overline{S}$ of the selecting circuit 121 as shown in FIG. 7 is supplied with H level voltage, while the input terminal M/$\overline{P}$ of the same is supplied with L level voltage, and the input terminal a/$\overline{s}$ of the gate circuit 171 as shown in FIG. 9 is supplied with H level voltage, while the input terminal m/$\overline{p}$ of the same is supplied with L level voltage. Accordingly, the output level at the output end c/$\overline{q8c}$ becomes H level or L level, depending upon the output level of the AND gate 162-170. The output level at the output end f/$\overline{e}$ is L level at this time. Accordingly, the output voltage $V_1$ of the average value circuit or the weighting average value circuit becomes $(V_A+V_B+V_C)/3$ or $(V_A+V_B)/2$, depending upon the three input voltages $V_A$, $V_B$ and $V_C$ fed to the selecting circuit 21.

Next, the method of selecting the arithmetic equation will be explained, with reference to FIGS. 11-14.

(1) It is assumed that the luminance signal $V_C$ obtained from the peripheral area 102C of the field to be photographed 106 as shown in FIG. 6 is larger than the reference voltage $V_{r0}$, that is, $V_C > V_{r0}$, and that the field to be photographed was judged to be an outdoor field (which includes a bright object, such as sky, in its background and which is judged to be a field having a bright peripheral portion). In this case, the reference voltages $V_{P1}$, $V_{P2}$, $V_{Q1}$ and $V_{Q2}$ (the interrelation between these voltages is: $V_{P2}<0<V_{P1}$, $V_{Q2}<0<V_{Q1}$) are used as constants, depending upon the values of the luminance signal difference $V_B-V_A$ (hereinafter referred to as $\Delta_{BA}$) and the luminance signal difference $V_C-V_B$ (hereinafter referred to as $\Delta_{CB}$), and the value of lightmeasurement $V_1-V_2$ is found by the following operations.

(1-1)
It is assumed that $$\begin{pmatrix} V_{P1} < \Delta_{BA} < V_{P1} \\ V_{Q1} < \Delta_{CB} \end{pmatrix}$$

Specifically, as shown in FIG. 13(a), the luminance signal difference $\Delta_{BA}$ between the luminance of the first sub-area 102A and that of the second sub-area 102B of the central area of the field to be photographed is decreased, while the luminance signal difference $\Delta_{CB}$ between the luminance of the second sub-area 102B and that of the peripheral area 102C is larger than the predetermined value $V_Q$ at the +side. In this case, it can be judged that the main object frequently exists both in the sub-area 102A and the sub-area 102B. Accordingly, the light-measurement is based on the luminance signals $V_A$ and $V_B$ at the sub-area 102A and the sub-area 102B, in order to provide a proper exposure to the main object. The compensating coefficient is decided as zero. The light measurement value is found by the following arithmetic equation.

$$V_1-V_2=(V+V_B)/2 \qquad (1)$$

Referring to the operation of the circuits shown in FIGS. 7 and 9, the description will be firstly given to the selecting circuit 121 as shown in FIG. 7. The luminance signal (voltage) $V_C$ of the peripheral area 102C is larger than the reference signal $V_{r0}$, so that the comparator 150 provides H level output, and consequently H level signal is fed to the control terminal B/$\overline{D}$ of the reference voltage generating circuit 151. The reference voltages of said circuit 151 are $V_{Pa}=V_{P1}$, $V_{Pb}=V_{P2}$, $V_{Qa}=V_{Q1}$, $V_{Qb}=V_{Q2}$. On the other hand, the output signal (voltage) $V_B-V_A$ of the operational amplifier 143, under the condition of $V_{P2}<\Delta_{BA}<V_{P1}$, is such that the output of the comparator 151 becomes L level and the output of the comparator 153 becomes H level. The output signal (voltage) $V_C-V_B$ of the operational amplifier 148, under the condition of $V_{Q1}<\Delta_{CB}$, is such that the output of the comparator 157 is H level and the output of the comparator 158 is H level. Accordingly, only the AND gate 165 provides H level output. Under the influence of the H level output of this AND gate 165, L level outputs of the AND gates 162-164, 166-170 and H level output of the comparator 150, the gate circuit 171 provides the output signal 171j at L level, making the output end c/q̄ at L level, and provides the output signal 171i at H level, and other output signals 171a–171h at L level. Thus the voltage at the 0₂ output terminal is 0V. Under this state, the output signal 171k of the gate circuit 171 is at L level and the output end f/ē is at L level. Accordingly, the output voltage of the operational amplifier 128 is $(V_A+V_B)/2$. At the operational amplifier 133, the reverse phase input end is supplied with 0V and, therefore, the output $V_1-V_2$ of said operational amplifier 133 is $(V_A+V_B)/2$.

(1-2)

It is assumed that $$\begin{pmatrix} V_{P1} < \Delta_{BA} \\ V_{Q1} < \Delta_{CB} \end{pmatrix}$$

Specifically, as shown in FIG. 13(b), the luminance signal difference $\Delta_{BA}$ between the luminance of the sub-area 102A and that of the sub-area 102B is larger than the predetermined value $VP_{10}$ at the + side and the luminance signal difference $\Delta_{CB}$ between the luminance of the sub-area 102B and that of the peripheral area 102C is also larger than the predetermined value $V_{Q1}$ at the + side. In this case, it can be judged that the main object frequently exists in whole area of the sub-area 102A and a part of the sub-area 102B. Accordingly, the light-measurement may be based on the luminance signal $V_A$ at the sub-area 102A only. However, it has been experimentally found that a better exposure can be obtained by paying consideration to the luminance signal in the background to some extent. The light measurement value $V_1-V_2$ is found, on the basis of the output voltages $V_A$ and $V_B$ of the sub-areas 102A and 102B, using compensating coefficient $V_{r2}$, by the following arithmetic equation:

$$V_1-V_2=(V_A+V_B)/2-V_{r2} \qquad (2)$$

Referring to the operation of the circuits, all of the comparators 150, 152, 153, 15 and 158 produce H level outputs and only AND gate 162 produces H level output while the other AND gates 163-170 produce L level outputs. Accordingly, the gate circuit 171 receives the outputs of the comparator 150 and the AND gates 162-170 and provides the output signal 171b at L level, and the output signals 171a, 171c–171i at L level. The output of the operational amplifier 128 is voltage $(V_A+V_B)/2$ and the output $V_1-V_2$ of the operational amplifier 133 is $(V_A+V_B)/2-V_{r2}$.

(1-3)

It is assumed that $$\begin{pmatrix} V_{P1} < \Delta_{BA} \\ V_{Q2} < \Delta_{CB} < V_{Q1} \end{pmatrix}$$

Specifically, a shown in FIG. 13(c), the luminance signal difference $\Delta_{BA}$ between the luminance of the sub-area 102A and that of the sub-area 102B is larger than the predetermined value $V_{P1}$ at the +side and the luminance signal difference $\Delta_{CB}$ between the luminance of the sub-area 102B and that of the peripheral area 102C is smaller. In this case, it can be judged that the main object frequently exists in whole area of the sub-area 102A and, particularly, the main object is frequently small. Accordingly, the light-measurement may be based on the luminance signals of the main object existing in the sub-area 102A. However it is preferrable to decide a proper exposure on the part of the main object, while paying consideration to the luminance signal $V_B$ of the sub-area 102B corresponding to the background. Thus, the light-measurement value $V_1-V_2$ is found, on the basis of the sub-areas 102A and 102B, using compensating coefficient $-V_{r1}$ ($V_{r2}<V_{r1}$), by the following arithmetic equation.

$$V_1-V_2=(V_A+V_B)/2-V_{r1} \qquad (3)$$

Referring to the operation of the circuits, all of the comparators 150, 152, 153 and 158 produce H level outputs, while the comparator 157 produces L level output, and the AND gate 163 produces H level output while the other AND gates 162, 164 and 170 produce L level outputs. Accordingly, the gate circuit 171 receives the outputs of the comparator 150 and the AND gates 162-170 and provides the output signal 171j at L level, the output 171a at H level and the output signals 171b–171i at L level. The output of the operational amplifier 128 is voltage $(V_A+V_B)/2$ and the output $V_1-V_2$ of the operational amplifier 133 is $(V_A+V_B)/2-V_{r1}$.

(1-4)

It is assumed that $$\begin{pmatrix} V_{P1} < \Delta_{BA} \\ \Delta_{CB} < V_{Q2} \end{pmatrix}$$

Specifically, as shown in FIG. 13(d), the luminance signal difference $\Delta_{BA}$ between the luminance of the sub-area 102A and that of the sub-area 102B is larger than the predetermined value $V_{P1}$ at the + side and the luminance signal difference $\Delta_{CB}$ between the luminance of the sub-area 102B and that of the peripheral area 102C is smaller than the predetermined value $V_{Q2}$ at the —side. In this case, it can be judged that the main object has a size substantially equal to that of the main object described in the above paragraph (1-3) and includes an object having high luminance (such as, sun, sea surface reflecting sunlight or the like) in the area corresponding to the sub-area 102B or the main object having high luminance exists in the area corresponding to the sub-area 102B. In this case, the inventor understood from the data that it may be a method for obtaining a good result to effect the light-measurement on the basis of all luminances of the areas 102A, 102B and 102C, using zero compensating coefficient, to find the light measurement value $V_1-V_3$ by the equation $[V_1-V_2=(V_A+V_B+V_C)/3]$.

The inventor has found that it is another method for obtaining good result to effect the light-measurement on the basis of the sub-areas 102A and 102B in the same manner as in the above case (1-3) and find the light-measurement value $V_1-V_2$, using the compensating coefficient $V_{r1}$ at the + side, by the following arithmetic equation:

$$V_1-V_2=(V_A-V_B)/2-V_{r1} \qquad (4)$$

Referring to the operation of the circuits, the comparators 150, 152, 153 produce H level outputs, while the comparators 157 and 158 produce L level outputs, and AND gate 164 produces H level output while the other AND gates 162, 163, 165–170 produce L level outputs. Accordingly, the gate circuit 171 receives the outputs of the comparator 150 and the AND gates 162-170 and provides the output signal 171j at L level, the output signal 171a at H level and the 171b–171i at L level. The output of the operational amplifier 128 is voltage $(V_A+V_B)/2$ and the output $V_1-V_2$ of the operational amplifier 133 is $(V_A+V_B)/2-V_{r1}$.

(1-5)
It is assumed that $$\begin{pmatrix} V_{P2} < \Delta_{BA} < V_{P1} \\ \Delta_{CB} < V_{Q2} \end{pmatrix}$$

Specifically, as shown in FIG. 13(e), the luminance signal difference $\Delta_{BA}$ between the luminance of the sub-area 102A and that of the sub-area 102B is small and the luminance signal difference $\Delta_{CB}$ between the luminance of the sub-area 102B and that of the peripheral area 102C is negative number having absolute value larger than that of $V_{Q2}$. In this case, it can be judged that the main object exists in both areas of the sub-area 102A and 102B and the main object is large and whitish. Accordingly, the light-measurement may be based on the luminances of the sub-areas 102A and 102B. However, the peripheral portion has lower luminance than the central portion, it is preferrable to find the light-measurement value, while paying some consideration to the luminance of the area 102C at the peripheral portion of the picture plane, in order to surely obtain a photograph of a whitish object in white color (highlight control). It has been found from data that such a consideration provides a better exposure value. Accordingly, in this case, in order to provide an exposure to take a photograph of the highlight portion of the object, the light-measurement is based upon all of the luminance signals $V_A$, $V_B$ and $V_C$ and the light-measurement value $V_1-V_2$ is found, using the compensating coefficient $V_{r3}$ at the + side, by the following arithmetic equation:

$$V_1-V_2=(V_A+V_B+V_C)/3-V_{r3} \qquad (5)$$

Referring to the operation of the circuits, the comparators 150 and 153 produce H level outputs, while the comparators 152, 157 and 158 produce L level outputs, and the AND gate 167 produces H level output, while the other AND gates 162–166, 168 and 170 produce L level outputs. Accordingly the gate circuit 171 receives the outputs of the comparator 150 and the AND gates 162–170 and provides the output signal 171j at H level, the output signal 171c at H level and the output signals 171a, 171b, 171d–171i at L level. The output of the operational amplifier 128 is voltage $(V_A+V_B+V_C)/3$ and the output $V_1-V_2$ of the operational amplifier 133 is voltage $(V_A+V_B+V_C)/3-V_{r3}$.

(1-6)
It is assumed that $$\begin{pmatrix} \Delta_{BA} < V_{P2} \\ \Delta_{CB} < V_{Q2} \end{pmatrix}$$

Specifically, as shown in FIG. 13(f), the luminance signal difference $\Delta_{BA}$ between the luminance of the sub-area 102A and that of the sub-area 102B is a negative number having an absolute value larger than the predetermined value $V_{P2}$ and the luminance signal difference $\Delta_{CB}$ between the luminance of the sub-area 102B and that of the peripheral area 102C is also a negative number having an absolute value larger than that of $V_{Q2}$. In this case, it can be judged that the main object exists in whole area of the sub-area 102A and a part of the sub-area 102B and the main object is a medium size and whitish. In this case, in order to provide an exposure to take a photograph of the highlight portion of the object, as in the case of (1-5), the light-measurement is based upon all of the luminances of the sub-area 102A, 102B and the peripheral area 102C and the light-measurement value $V_1-V_2$ is found, using the compensating coefficient $V_{r4}$ ($V_{r4}<V_{r3}$) by the following arithmetic equation:

$$V_1-V_2=(V_A+V_B+V_C)/3-V_{r4} \qquad (6)$$

Referring to the operation of the circuits, the comparator 150 produces H level output, while the comparators 152-158 produce L level outputs, and the AND gate 170 produces H level output, while the other AND gates 162–169 produce L level outputs. Accordingly the gate circuit 171 receives the outputs of the comparator 150 and the AND gates 162–170 and provides the output signal 171j at H level, the output signal 171d at H level and the output signals 171a–171c, 171e–171i at L level. The output of the operational amplifier 128 is voltage $(V_A+V_B+V_C)/3$ and the output $V_1-V_2$ of the operational amplifier 133 is voltage $(V_A+V_B+V_C)/3-V_{r4}$.

(1-7)
It is assumed that $$\begin{pmatrix} \Delta_{BA} < V_{P2} \\ V_{Q2} < \Delta_{CB} < V_{Q1} \end{pmatrix}$$

Specifically, as shown in FIG. 13(g), the luminance signal difference $\Delta_{BA}$ between the luminance of the sub-area 102A and that of the sub-area 102B is a negative number having an absolute value larger than the predetermined value $V_{P2}$ and the luminance signal difference $\Delta_{CB}$ between the luminance of the sub-area 102B and that of the peripheral area 102C is small. In this case, in order to provide an exposure to take a photograph of the highlight portion of the object, as in the above cases, the light-measurement is based upon all of the luminances of the sub-areas 102A, 102B and the peripheral area 102C and the light-measurement value $V_1-V_2$ is found, using the zero compensating coefficient, by the following arithmetic equation:

$$V_1-V_2=(V_A+V_B+V_C)/3 \quad (7)$$

Referring to the operation of the circuits, the comparators 150 and 158 produce H level outputs, while the comparators 152, 153 and 157 produce L level outputs, and the AND gate 169 produces H level output, while the other AND gates 162–168, 170 produce L level outputs. Accordingly the gate circuit 171 receives the outputs of the comparator 150 and the AND gates 162–170 and provides the output signal 171j at H level, the output signal 171i at H level and the output signals 171a–171h at L level. The output of the operational amplifier 128 is voltage $(V_A+V_B+V_C)/3$ and the output $V_1-V_2$ of the operational amplifier 133 is voltage $(V_A+V_B+V_C)/3$.

(1-8)
It is assumed that $$\begin{pmatrix} \Delta_{BA} < V_{P2} \\ V_{Q1} < \Delta_{CB} \end{pmatrix}$$

Specifically, as shown in FIG. 13(h), the luminance signal difference $\Delta_{BA}$ between the luminance of the sub-area 102A and that of the sub-area 102B is a negative number having an absolute value larger than the predetermined value $V_{P2}$ and the luminance signal difference $\Delta_{CB}$ between the luminance of the sub-area 102B and that of the peripheral area 102C is larger than the predetermined value $V_{Q1}$.

In this case, it can be judged that the main object has a similar size as that described in the above case (1-1) and has a substantial difference in luminance between portions of the same and the sub-area 102A has slightly high luminance, or that a substially low luminance object occupies the sub-area 102B, as in the case of the photograph of scenery or the like. In such case, the inventor understood from data that it is a method for obtaining a good result to effect the light-measurement on the basis of all of the luminances of the sub-areas 102A, 102B and the peripheral area 102C and to find the light-measurement value $V_1-4V_2$, using zero compensating coefficient, by the arithmetic equation $[V_1-V_2=(V_A+V_B+V_C)/3]$. However we found that a better result can be obtained by effecting the light-measurement on the basis of the luminances of the sub-areas 102A and 102B and finding the light-measurement value, using zero compensating coefficient, by the following arithmetic equation:

$$V_1-V_2=(V_A+V_B)/2 \quad (8)$$

Referring to the operation of the circuits, the comparators 150, 157 and 158 produce H level outputs, while the comparators 152 and 153 produce L level outputs, and the AND gate 168 produces H level output while the other AND gates 162–167, 169, 170 produce L level outputs. Accordingly the gate circuit 171 receives the outputs of the comparator 150 and the AND gates 162–170 and provides the output signal 171j at L level, the output signal 171i at H level and the output signals 171a–171h at L level. The output of the operational amplifier 128 is voltage $(V_A+V_B)/2$ and the output $V_1-V_2$ of the operational amplifier 133 is voltage $(V_A+V_B)/2$.

(1-9)
It is assumed that $$\begin{pmatrix} V_{P2} < \Delta_{BA} < V_{P1} \\ V_{Q2} < \Delta_{CB} < V_{Q1} \end{pmatrix}$$

Specifically, as shown in FIG. 13(i), the luminance signal difference $\Delta_{BA}$ between the sub-area 102A and the sub-area 102B is small and the luminance signal difference $\Delta_{CB}$ between the sub-area 102B and the peripheral area 102 is also small. In this case it is judged that the main object occupies whole area of the field to be photographed or there is no specific intention of determining the main object, such as the case of photographing scenery or the like. In this case, the light-measurement is based on the luminances of the sub-areas 102A, 102B and the peripheral area 102C and the light-measurement value is found, using zero compensating coefficient, by the following arithmetic equation:

$$V_1-V_2=(V_A+V_B+V_C)/3 \quad (9)$$

Referring to the operation of the circuits, the comparators 150, 153 and 158 produce H level outputs, while the comparators 152 and 157 produce L level outputs, and the AND gate 166 produces H level output while the other AND gates 162–165, 167–170 produce L level outputs. Accordingly the gate circuit 171 receives the outputs of the comparator 150 and the AND gates 162–170 and provides the output signal 171j at H level, the output signal 171i at H level and the output signals 171a–171h at L level. The output of the operational amplifier 128 is voltage $(V_A 30\ V_B+V_C)/3$ and the output $V_1-V_2$ of the operational amplifier 133 is voltage $(V_A+V_B+V_C)/3$.

(2) It is assumed that the luminance signal $V_C$ obtained from the peripheral area 102C of the field to be photographed 106 as shown in FIG. 6 is smaller than the reference voltage $V_{r0}$, that is, $V_C < V_{r0}$, and that the field to be photographed was judged to be an indoor field which includes a wall of room in its background. In this case, the reference voltages $V_{P3}$, $V_{P4}$, $V_{Q3}$ and $V_{Q4}$ (the interrelation between these voltages is: $V_{P4} < 0 < V_{P3}$, $V_{Q4} < 0 < V_{Q3}$) are used as constants, depending upon the values of the luminance signal difference $V_B-V_A$ (hereinafter referred to as $\Delta_{BA}$) and the luminance signal difference $V_C-V_B$ (hereinafter referred to as $\Delta_{CB}$), and the value of light-measurement $V_1-V_2$ is found by the following operations, in the same manner as in the case of (1).

(2-1)
It is assumed that $$\begin{pmatrix} V_{P4} < \Delta_{BA} < V_{P3} \\ V_Q < \Delta_{CB} \end{pmatrix}$$

Specifically, as shown in FIG. 14(a), the luminance signal difference $\Delta_{BA}$ between the sub-area 102A and the sub-area 102B is decresed, while the luminance signal difference $\Delta_{CB}$ between the sub-area 102B and the peripheral area 102C is larger than the predetermined value $V_{Q3}$. In this case, it can be judged that the main object exists both in the sub-area 102A and the sub-area 102B and it is large and dark. Accordingly, the light-measurement may be based on the luminances of sub-areas 102A and 102B and the light-measurement value may be found, using zero compensating coefficient. However, it is preferrable to surely obtain a photograph of a dark object in black color (shadow control). In the embodiment, in order to provide a better exposure value to express shadow portion of the object to be photographed, the light-measurement is based on the luminances of the sub-areas 102A and 102B and the light-measurement value is determined, using the compensating coefficient of $V_{r7}$ at the — side, by the following arithmetic equation:

$$V_1 - V_2 = (V_A + V_B)/2 - V_{r7} \qquad (10)$$

The operation of the circuits will be described. The luminance signal (voltage) $V_C$ of the peripheral area 102C is smaller than the reference signal $V_{r0}$, so that the comparator 150 provides L level output, and consequently L level signal is fed to the control terminal B/$\overline{D}$ of the reference voltage generating circuit 151. The reference voltages of said circuit 151 are $V_{Pa} = V_{P3}$, $V_{Pb} = V_{P4}$, $V_{Qa} = V_{Q3}$, $V_{Qb} = V_{Q4}$. On the other hand, the comparators 150 and 152 produce L level outputs, while the comparators 153, 157 and 158 produce H level outputs, and the AND gate 165 produces H level output, while the other AND gates 162-164, 166-170 produce L level outputs. Accordingly the gate circuit 171 receives the outputs of the comparator 150 and the AND gates 162-170 and provides the output signal 171j at L level, the output signal 171g at H level and the output signals 171a-171f, 171h, 171i at L level. The output of the operational amplifier 128 is voltage $(V_A + V_B)/2$ and the output $V_1 - V_2$ of the operational amplifier 133 is voltage $(V_A + V_B)/2 - V_{r7}$.

(2-2)
It is assumed that $$\begin{pmatrix} V_{P3} < \Delta_{BA} \\ V_{Q3} < \Delta_{CB} \end{pmatrix}$$

Specifically, as shown FIG. 14(b), the luminance signal difference $\Delta_{BA}$ between the sub-area 102A and the sub-area 102B is larger than the predetermined value $V_{P3}$ and the luminance signal difference $\Delta_{CB}$ between the sub-area 102B and the peripheral area 102C is also larger than the predetermined value $V_{Q3}$. In this case, it can be judged that the main object exists in whole area of the sub-area 102A and a part of the sub-area 102B and it is dark. In the same manner as in the case of the above (2-1), in order to provide a better exposure value, to express shadow portion of the object to be photographed, the light-measurement is based on the luminances of the sub-areas 102A and 102B and the light-measurement value is determined, using the compensating coefficient of $V_{r8}$ at the — side ($|V_{r8}| < |V_{R7}|$), by the following arithmetic equation:

$$V_1 - V_2 = (V_A + V_B)/2 - V_{r8} \qquad (11)$$

Referring to the operation of the circuits, the comparators 150 produces L level output, while all of the comparators 152-158 produce H level outputs, and the AND gate 162 produces H level output, while the other AND gates 163-170, produce L level outputs. Accordingly the gate circuit 171 receives the outputs of the comparator 150 and the AND gates 162-170 and provides the output signal 171j at L level, the output signal 171h at H level and the output signals 171a-171g, 171i at L level. The output of the operational amplifier 128 is voltage $(V_A + V_B)/2$ and the output $V_1 - V_2$ of the operational amplifier 133 is voltage $(V_A + V_B)/2 - V_{r8}$.

(2-3)
It is assumed that $$\begin{pmatrix} V_{P3} < \Delta_{BA} \\ V_{Q4} < \Delta_{CB} < V_{Q3} \end{pmatrix}$$

Specifically, as shown in FIG. 14(c), the luminance signal difference $\Delta_{BA}$ between the sub-area 102A and the sub-area 102B is larger than the predetermined value $V_{P3}$ and the luminance signal difference $\Delta_{CB}$ between the sub-area 102B and the peripheral area 102C is small. In this case, it can be judged that the main object exists in whole area of the sub-area 102A or the main object is small and dark. In this case, in order to provide a better exposure value, to express shadow portion of the object to be photographed, the light-measurement is based on the luminances of the sub-areas 102A and 102B and the light-measurement value is determined, using zero compensating coefficient, by the following arithmetic equation:

$$V_1 - V_2 = (V_A + V_B)/2 \qquad (12)$$

Referring to the operation of the circuits, the comparators 150 and 157 produce L level outputs, while the comparators 152, 153, 158 produce H level outputs, and the AND gate 163 produces H level output, while the other AND gates 162, 164-170 produce L level outputs. Accordingly the gate circuit 171 receives the outputs of the comparator 150 and the AND gates 162-170 and provides the output signal 171j at L level, the output signal 171i at H level and the output signals 171a, 171h at L level. The output of the operational amplifier 128 is voltage $(V_A + V_B)/2$ and the output $V_1 - V_2$ of the operational amplifier 133 is voltage $(V_A + V_B)/2$.

(2-4)
It is assumed that $$\begin{pmatrix} V_{P3} < \Delta_{BA} \\ \Delta_{CB} < V_{Q4} \end{pmatrix}$$

Specifically, as shown in FIG. 14(d), the luminance signal difference $\Delta_{BA}$ between the sub-area 102A and the sub-area 102B is larger than the predetermined value $V_{P3}$ and the luminance signal difference $\Delta_{CB}$ between the sub-area 102B and the peripheral area 102C is a negative number having an absolute value larger than the predetermined value $V_{Q4}$. In this case, it can be judged that the main object to be photographed is a usual object having substantially same size as that described in the above case (2-3) and including a highly luminant object (for example, electric lamp) in the sub-area 102B. In can be concluded from data that a highly luminant object in the sub-area 102B in the case of indoor photographing has lower influence than a highly luminant object (for example, sun) in the sub-area 102B in the case of outdoor photographing. Accordingly, the decision of the light-measurement value $V_1 - V_2$ is based upon the luminances of the sub-areas 102A, 102B and the peripheral area 102C and, in order to express highlight portion in the sub-area 102B, the value $V_1 - V_2$ is determined, using zero compensating coefficient, by the following arithmetic equation:

$$V_1-V_2=(V_A+V_B+V_C)/3 \quad (13)$$

Referring to the operation of the circuits, the comparators 150, 157 and 158 produce L level outputs, while the comparators 152 and 153 produce H level outputs, and the AND gate 164 produces H level output, while the other AND gates 162, 163, 165–170 produce L level outputs. Accordingly the gate circuit 171 receives the outputs of the comparator 150 and the AND gates 162–170 and provides the output signal 171j at H level, the output signal 171i at H level and the output signals 171a–171h at L level. The output of the operational amplifier 128 is voltage $(V_A+V_B+V_C)/3$ and the output $V_1-V_2$ of the operational amplifier 133 is voltage $(V_A+V_B+V_C)/3$.

(2-5)
It is assumed that $$\begin{pmatrix} V_{P4} < \Delta_{BA} < V_{P3} \\ \Delta_{CB} < V_{Q4} \end{pmatrix}$$

Specifically, as shown in FIG. 14(e), the luminance signal difference $\Delta_{BA}$ between the sub-area 102A and the sub-area 102B is small and the luminance signal difference $\Delta_{CB}$ between the sub-area 102B and the peripheral area 102C is negative number having absolute value larger than the predetermined value $V_{Q4}$. In this case, it can be judged that the main object exists in both of the sub-areas 102A and 102B and only these sub-areas 102A and 102B are illuminated with light. In this case, the light-measurement may be based upon only the luminances of the sub-areas 102A and 102B. In the embodiment, however, some consideration is given to the dark peripheral area, that is the peripheral area 102C, and the light-measurement value $V_1-V_2$ is determined, on the basis of the luminances of the sub-areas 102A, 102B and the peripheral area 102C, by the following equation, using zero compensating coefficient:

$$V_1-V_2=(V_A+V_B+V_C)/3 \quad (14)$$

Referring to the operation of the circuits, the comparators 150, 152, 157 and 158 produce L level outputs, while the comparator 153 produces H level output, and the AND gate 167 produces H level output, while the other AND gates 162–166, 168 and 170 produce L level outputs. Accordingly the gate circuit 171 receives the outputs of the comparator 150 and the AND gates 162–170 and provides the output signal 171j at H level, the output signal 171i at H level and the output signals 171a–171h at L level. The output of the operational amplifier 128 is voltage $(V_A+V_B+V_C)/3$ and the output $V_1-V_2$ of the operational amplifier 133 is voltage $(V_A+V_B+V_C)/3$.

(2-6)
It is assumed that $$\begin{pmatrix} \Delta_{BA} < V_{P4} \\ \Delta_{CB} < V_{Q4} \end{pmatrix}$$

Specifically, as shown in FIG. 14(f), the luminance signal difference $\Delta_{BA}$ between the sub-area 102A and the sub-area 102B is a negative number having an absolute value larger than the predetermined value $V_{P4}$ and the luminance signal difference $\Delta_{CB}$ between the sub-area 102B and the peripheral area 102C is also a negative number having an absolute value larger than that of the predetermined value $V_{Q4}$. In this case it is judged that the main object exists in whole area of the sub-area 102A and a part of the sub-area 102B and the whole of the sub-area 102A and the part of the sub-area 102B are illuminated with light. In this case, it is necessary to make compensation by compensating coefficient in order to provide a proper exposure to the object, as compared with the above case (2-5). Accordingly, the light-measurement is effected on the basis of the luminances of the sub-areas 102A, 102B and the peripheral area 102C, and the light-measurement value $V_1-V_2$ is determined by the following equation, using the compensating coefficient $V_{r6}$ at the − side.

$$V_1-V_2=(V_A+V_B+V_C)/3-V_{r6} \quad (15)$$

Referring to the operation of the circuits, all of the comparators 150–158 produce L level outputs, and the AND gate 170 produces H level output, while the other AND gates 162–169 produce L level outputs. Accordingly the gate circuit 171 receives the outputs of the comparator 150 and the AND gates 162–170 and provides the output signal 171j at H level, the output signal 171f at H level and the output signals 171a–171e, 171g–171i at L level. The output of the operational amplifier 128 is voltage $(V_A+V_B+V_C)/3$ and the output $V_1-V_2$ of the operational amplifier 133 is voltage $(V_A+V_B+V_C)/3-V_{r6}$.

(2-7)
It is assumed that $$\begin{pmatrix} \Delta_{BA} < V_{P4} \\ V_{Q4} < \Delta_{CB} < V_{Q3} \end{pmatrix}$$

Specifically, as shown in FIG. 14(g), the luminance signal difference $\Delta_{BA}$ between the sub-area 102A and the sub-area 102B is a negative number having an absolute value larger than the predetermined value $V_{P4}$ and the luminance signal difference $\Delta_{CB}$ between the sub-area 102B and the peripheral area 102C is small. In this case it is judged that the main object exists in whole area of the sub-area 102A or the main object is small and exists in a part of the sub-area 102A. In this case, in order to provide a proper exposure to the object, the light-measurement is effected on the basis of the luminances of the sub-areas 102A, 102B and the peripheral area 102C, and the light-measurement value $V_1-V_2$ is determined by the following equation, using the compensating coefficient $V_{r5}$ ($|V_{r5}| > |V_{r6}|$).

$$V_1-V_2=(V_A+V_B+V_C)/3-V_{r5} \quad (16)$$

Referring to the operation of the circuits, the comparators 150, 152, 153 and 157 produce L level outputs, while the comparators 158 produces H level output, and the AND gate 169 produces H level output, while the other AND gates 162–168, 170 produce L level outputs. Accordingly the gate circuit 171 receives the outputs of the comparator 150 and the AND gates 162–170 and provides the output signal 171j at H level, the output signal 171e at H level and the output signals 171a–171d, 171f–171i at L level. The output of the operational amplifier 128 is voltage $(V_A+V_B+V_C)/3$ and the output $V_1-V_2$ of the operational amplifier 133 is voltage $(V_A+V_B+V_C)/3-V_{r5}$.

(2-8)

It is assumed that

Specifically, as shown in FIG. 14(f), the luminance signal difference $\Delta_{BA}$ between the sub-area 102A and the sub-area 102B is a negative number having an absolute value larger than the predetermined value $V_{P4}$ and the luminance signal difference $\Delta_{CB}$ between the sub-area 102B and the peripheral area 102C is larger than the predetermined value $V_{Q3}$.

In this case it is judged that the main object has substantially same size as in the above case (2-1) and includes light and dark portions, particularly dark portion in the sub-area 102B and it is a blackish object as a whole, or that the sub-area 102B is substantially occupied with an object having low luminance, such as in the case of photograph of scenery or the like. In this case, the light-measurement is effected on the basis of all of the luminances of the sub-areas 102A, 102B and the peripheral area 102C and the light-measurement value $V_1-V_2$ is determined by the following equation, using the compensating coefficient $V_{r5}$ at the − side to express the shadow portion of the object.

$$V_1 - V_2 = (V_A + V_B + V_C)/3 - V_{r5} \quad (17)$$

Referring to the operation of the circuits, the comparators 150-153 produce L level outputs, while the comparators 157, 158 produce H level outputs, and the AND gate 168 produces H level output, while the other AND gates 162-167, 169, 170 produce L level outputs. Accordingly the gate circuit 171 receives the outputs of the comparator 150 and the AND gates 162-170 and provides the output signal 171j at H level, the output signal 171e at H level and the output signals 171a-171d, 171f-171i at L level. The output of the operational amplifier 128 is voltage $(V_A+V_B+V_C)/3$ and the output $V_1-V_2$ of the operational amplifier 133 is voltage $(V_A+V_B+V_C)/3-V_{r5}$.

(2-9)

It is assumed that $$\begin{pmatrix} V_{P4} < \Delta_{BA} < V_{P3} \\ V_{Q4} < \Delta_{CB} < V_{Q3} \end{pmatrix}$$

Specifically, as shown in FIG. 14(i), the luminance signal difference $\Delta_{BA}$ between the sub-area 102A and the sub-area 102B is small and the luminance signal difference $\Delta_{CB}$ between the sub-area 102B and the peripheral area 102C is also small. In this case it is judged that the main object occupies whole area of the field to be photographed or a particular object is not set as the main object. The light-measurement is effected on the basis of all of the luminances of the sub-areas 102A, 102B and the peripheral area 102C, in order to provide a proper exposure to all of these areas, and the light-measurement value $V_1-V_2$ is determined by the following equation, using zero compensating coefficient.

$$V_1 - V_2 = (V_A + V_B + V_C)/3 \quad (18)$$

Referring to the operation of the circuits, the comparators 150, 152 and 157 produce L level outputs, while the comparators 153, 158 produce H level outputs, and the AND gate 166 produces H level output, while the other AND gates 162-165, 167-170 produce L level outputs. Accordingly the gate circuit 171 receives the outputs of the comparator 150 and the AND gates 162-170 and provides the output signal 171j at H level, the output signal 171i at H level and the output signals 171a-171h at L level. The output of the operational amplifier 128 is voltage $(V_A+V_B+V_C)/3$ and the output $V_1-V_2$ of the operational amplifier 133 is voltage $(V_A+V_B+V_C)/3$.

(II) Servo mode

Next, the servo mode will be described.

The servo mode means AF mode in which the AF is actuated so that a photographing lens is always focussed to an object to be photographed, that is, the photographing lens is driven into in-focus state with the object during a power is supplied to the AF and if the object moves the photographing lens is further driven into in-focus state with the object moved. Accordingly the photographing lens is always held in in-focus state with the object existing in the distance measuring range of said lens and, consequently, this mode is suitable to photographing of a moving object.

In this mode, therefore, it can be assumed that a main object, such as person, exists at the center of the picture plane. In this case, the light-measurement value is preferably determined on the basis of the luminance signal of the central part.

In operation of the circuit, when the servo mode was selected, both of the input end A/$\overline{S}$ and the input end M/$\overline{P}$ in FIG. 7 are supplied with L level voltages and both of the input end a/$\overline{s}$ and the input end m/$\overline{p}$ of the gate circuit 171 in FIG. 9 are supplied with L level voltages. Accordingly, both of the outputs from the output ends c/$\overline{q}$ and f/$\overline{e}$ in FIG. 10 are at L level. Accordingly, the output voltage $V_1$ of the average value circuit or weighting average value circuit is always $(V_A+V_B)/2$.

Next, the details of the method of selecting arithmetic equation will be explained with reference to FIGS. 12, 15 and 16.

(1) It is assumed that the luminance signal $V_C$ obtained from the peripheral area 102C of the field to be photographed 106 as shown in FIG. 6 is larger than the reference voltage $V_{r0}$, that is, $V_C > V_{r0}$, and that the field to be photographed was judged to be an outdoor field (which includes a bright object, such as sky, in its background and which is judged to be a field having a bright peripheral portion). In this case, the reference voltages $V_{P1}$, $V_{P2}$, $V_{Q1}$ and $V_{Q2}$ (the interrelation between these voltages is: $V_{P2} < 0 < F_{P1}$, $V_{Q2} < 0 < V_{Q1}$) are used as constants, depending upon the values of the luminance signal difference $V_B-V_A$ (hereinafter referred to as $\Delta_{BA}$) and the luminance signal difference $V_C-V_B$ (hereinafter referred to as $\Delta_{CB}$), and the value of light-measurement $V_1-V_2$ is found by the following operations.

(1-1)

It is assumed that $$\begin{pmatrix} V_{P2} < \Delta_{BA} < V_{P1} \\ V_{Q1} < \Delta_{CB} \end{pmatrix}$$

Specifically, as shown in FIG. 15(a), the luminance signal difference $\Delta_{BA}$ between the luminance of the first sub-area 102A and that of the second sub-area 102B of the central area of the field to be photographed is decreased, while the luminance signal difference $\Delta_{CB}$ between the luminance of the second sub-area 102B and that of the peripheral area 102C is larger than the predetermined value $V_Q$ at the + side. In this case, it can be judged that the main object frequently exists both in the sub-area 102A and the sub-area 102B. Accordingly, the light-measurement is based on the luminance signals $V_A$ and $V_B$ at the sub-area 102A and the sub-area 102B, in order to provide a proper exposure to the main object. The compensating coefficient is decided as zero. The light measurement value is found by the following arithmetic equation.

$$V_1 - V_2 = (V_A + V_B)/2 \tag{1}$$

Referring to the operaton of the circuits shown in FIGS. 7 and 9, the description will be firstly given to the selecting circuit 121 as shown in FIG. 7. The luminance signal (voltage) $V_C$ of the peripheral area 102C is larger than the reference signal $V_{r0}$, so that the comparator 150 provides H level output, and consequently H level signal is fed to the control terminal $B/\overline{D}$ of the reference voltage generating circuit 151. The reference voltages of said circuit 151 are $V_{Pa} = V_{P1}$, $V_{Pb} = V_{P2}$, $V_{Qa} = V_{Q1}$, $V_{Qb} = V_{Q2}$. On the other hand, the output signal (voltage) $V_B - V_A$ of the operational amplifier 143, under the condition of $V_{P2} < \Delta_{BA} < V_{P1}$, is such that the output of the comparator 151 becomes L level and the output of the comparator 153 becomes H level. The output signal (voltage) $V_C - V_B$ of the operational amplifier 148, under the condition of $V_{Q1} < \Delta_{CB}$, is such that the output of the comparator 157 is H level and the output of the comparator 158 is H level. Accordingly, only the AND gate 165 provides H level output. Under the influence of the H level output of this AND gate 165, L level outputs of the AND gates 162-164, 166-170 and H level output of the comparator 150, the gate circuit 171 provides the output signal 171$j$ at L level, making the output end c/$\overline{q}$ at L level, and provides the output signal 171$i$ at H level, and other output signals 171$a$-171$h$ at L level. Accordingly, the output voltage of the operational amplifier 128 is $(V_A + V_B)/2$. At the operational amplifier 133, the reverse phase input end is supplied with OV and, therefore, the output $V_1 - V_2$ of said operational amplifier 133 is $(V_A + V_B)/2$.

(1-2)

It is assumed that $$\begin{pmatrix} V_{P1} < \Delta_{BA} \\ V_{Q1} < \Delta_{CB} \end{pmatrix}$$

Specifically, as shown in FIG. 15(), the luminance signal difference $\Delta_{BA}$ between the luminance of the sub-area 102A and that of the sub-area 102B is larger than the predetermined value $V_{P1}$ at the + side and the luminance signal difference $\Delta_{CB}$ between the luminance of the sub-are 102B and that of the peripheral area 102C is also larger than the predetermined value $V_{Q1}$ at the + side. In this case, it can be judged that the main object frequently exists in whole area of the sub-area 102A and a part of the sub-area 102B. Accordingly, the light-measurement may be based on the luminance signal $V_A$ at the sub-area 102A only. However, it has been experimentally found that a better exposure can be obtained by paying consideration to the luminance signal in the background to some extent. The light measurement value $V_1 - V_2$ is found, on the basis of the output voltages $V_A$ and $V_B$ of the sub-areas 102A and 102B, by the following arithmetic equation, using compensating coefficient $V_{r2}$:

$$V_1 - V_2 = (V_A + V_B)/2 - V_{r2} \tag{2}$$

Referring to the operation of the circuits, all of the comparators 150, 152, 153, 157 and 158 produce H level outputs and only AND gate 162 produces H level output while the other AND gates 163-170 produce L level outputs. Accordingly, the gate circuit 171 receives the outputs of the comparator 150 and the AND gates 162-170 and provides the output signal 171$b$ at H level, and the output signals 171$a$, 171$c$-171$i$ at L level. The output of the operational amplifier 128 is voltage $(V_A + V_B)/2$ and the output $V_1 - V_2$ of the operational amplifier 133 is $(V_A + V_B)/2 - V_{r2}$.

(1-3)

It is assumed that $$\begin{pmatrix} V_{P1} < \Delta_{BA} \\ V_{Q2} < \Delta_{CB} < V_{Q1} \end{pmatrix}$$

Specifically, as shown in FIG. 15(c), the luminance signal difference $\Delta_{BA}$ between the luminance of the sub-area 102A and that of the sub-area 102B is larger than the predetermined value $V_{P1}$ at the + side and the luminance signal difference $\Delta_{CB}$ between the luminance of the sub-area 102B and that of the peripheral area 102C is smaller. In this case, it can be judged that the main object frequently exists in whole area of the sub-area 102A and, particularly, the main object is frequently small. Accordingly, the light-measurement may be based on the luminance signals of the main object existing in the sub-area 102A. However it is preferable to decide a proper exposure on the part of the main object, while paying consideration to the luminance signal $V_B$ of the sub-area 102B corresponding to the background. Thus, the light-measurement value $V_1 - V_2$ is found, on the basis of the sub-areas 102A and 102B, using compensating coefficient $-V_{r1}$ ($V_{r2} < V_{r1}$), by the following arithmetic equation.

$$V_1 - V_2 = (V_A + V_B)/2 - V_{r1} \tag{3}$$

Referring to the operation of the circuits, all of the comparators 150, 152, 153 and 158 produce H level outputs, while the comparator 157 produces L level output, and the AND gate 163 produces H level output while the other AND gates 162, 164-170 produce L level outputs. Accordingly, the gate circuit 171 receives the outputs of the comparator 150 and the AND gates 162-170 and provides the output signal 171$a$ at H level and the output signals 171$b$-171$i$ at L level. The output of the operational amplifier 128 is voltage $(V_A + V_B)/2$ and the output $V_1 - V_2$ of the operational amplifier 133 is $(V_A + V_B)/2 - V_{r1}$.

(1-4)

It is assumed that $$\begin{pmatrix} V_{P1} < \Delta_{BA} \\ V_{CB} < \Delta_{Q2} \end{pmatrix}$$

Specifically, as shown in FIG. 15(d), the luminance signal difference $\Delta_{BA}$ between the luminance of the sub-area 102A and that of the sub-area 102B is larger than the predetermined value $V_{P1}$ at the + side and the luminance signal difference $\Delta_{CB}$ between the luminance of the sub-area 102B and that of the peripheral area 102C is smaller than the predetermined value $V_{Q2}$ at the — side. In this case, it can be judged that the main object has a size substantially equal to that of the main object described in the above paragraph (1-3) and includes an object having high luminance (such as, sun, sea surface reflecting sunlight or the like) in the area corresponding to the sub-area 102B or the main object having high luminance exists in the area corresponding to the sub-area 102B. In this case the light-measurement is based upo the luminances of the sub-areas 102A and 102B in the same manner as in the above case (1-3) and the light-measurement value $V_1-V_2$, is determined, using the compensating coefficient $V_{r1}$ at the $+$ side, by the following arithmetic equation:

$$V_1 - V_2 = (V_A + V_B)/2 - V_{r1} \quad (4)$$

Referring to the operation of the circuits, the comparators 150, 152, 153 produce H level outputs, while the comparators 157 and 158 produce L level outputs, and AND gate 164 produces H level output while the other AND gates 162, 163, 165-170 produce L level outputs. Accordingly, the gate circuit 171 receives the outputs of the comparator 150 and the AND gates 162-170 and provides the output signal 171a at H level and the output signals 171b-171i at L level. The output of the operational amplifier 128 is voltage $(V_A+V_B)/2$ and the output $V_1-V_2$ of the operational amplifier 133 is $(V_A+V_B)/2-V_{r1}$.

(1-5)
It is assumed that $$\begin{pmatrix} V_{P2} < \Delta_{BA} < V_{P1} \\ \Delta_{CB} < V_{Q2} \end{pmatrix}$$

Specifically, as shown in FIG. 15(e), the luminance signal difference $\Delta_{BA}$ between the luminance of the sub-area 102A and that of the sub-area 102B is small and the luminance signal difference $\Delta_{CB}$ between the luminance of the sub-area 102B and that of the peripheral area 102C is negative number having absolute value larger than that of $V_{Q2}$. In this case, it can be judged that the main object exists in both areas of the sub-area 102A and 102B and the main object is large and whitish. Accordingly, in this case, in order to provide an exposure to take a photograph of the highlight portion of the object, the light-measurement is based upon all of the luminance signals $V_A$ and $V_B$ and the light-measurement value $V_1-V_2$ is found, using the compensating coefficient $V_{r3}$ at the $+$ side, by the following arithmetic equation:

$$V_1-V_2=(V_A+V_B)/2-V_{r3} \quad (5)$$

Referring to the operation of the circuits, the comparators 150 and 153 produce H level outputs, while the comparators 152, 157 and 158 produce L level outputs, and the AND gate 167 produces H level output, while the other AND gates 162-166, 168-170 produce L level outputs. Accordingly the gate circuit 171 receives the outputs of the comparator 150 and the AND gates 162-170 and provides the output signal 171c at H level and the output signals 171a, 171b, 171d-171i at L level. The output of the operational amplifier 128 is voltage $(V_A+V_B)/2$ and the output $V_1-V_2$ of the operational amplifier 133 is voltage $(V_A+V_B)/2-V_{r3}$.

(1-6)
It is assumed that $$\begin{pmatrix} \Delta_{BA} < V_{P2} \\ \Delta_{CB} < V_{Q2} \end{pmatrix}$$

Specifically, as shown in FIG. 15(f), the luminance signal difference $\Delta_{BA}$ between the luminance of the sub-area 102A and that of the sub-area 102B is a negative number having an absolute value larger than the predetermined value $V_{P2}$ and the luminance signal difference $\Delta_{CB}$ between the luminance of the sub-area 102B and that of the peripheral area 102C is also a negative number having an absolute value larger than that of $V_{Q2}$. In this case, it can be judged that the main object exists in whole area of the sub-area 102A and a part of the sub-area 102B and the main object is a medium size and whitish object. In this case, in order to provide an exposure to take a photograph of the highlight portion of the object, as in the case of (1-5), the light-measurement is based upon all of the luminances of the sub-area 102A, 102B and the light-measurement value $V_1-V_2$ is found, using the compensating coefficient $V_{r4}$ ($V_{r4} < V_{r3}$) by the following arithmetic equation:

$$V_1-V_2=(V_A+V_B)/2-V_{r4} \quad (6)$$

Referring to the operation of the circuits, the comparator 150 produces H level output, while the comparators 152-158 produce L level outputs, and the AND gate 170 produces H level output, while the other AND gates 162-169 produce L level outputs. Accordingly the gate circuit 171 receives the outputs of the comparator 150 and the AND gates 162-170 and provides the output signal 171d at H level and the output signals 171a-171c, 171e-171i at L level. The output of the operational amplifier 128 is voltage $(V_A+V_B)/2$ and the output $V_1-V_2$ of the operational amplifier 133 is voltage $(V_A+V_B)/2-V_{r4}$.

(1-7)
It is assumed that $$\begin{pmatrix} \Delta_{BA} < V_{P2} \\ V_{Q2} < \Delta_{CB} < V_{Q1} \end{pmatrix}$$

Specifically, as shown in FIG. 15(g), the luminance signal difference $\Delta_{BA}$ between the luminance of the sub-area 102A and that of the sub-area 102B is a negative number having an absolute value larger than the predetermined value $V_{P2}$ and the luminance signal difference $\Delta_{CB}$ between the luminance of the sub-area 102B and that of the peripheral area 102C is small. In this case, in order to provide an exposure to take a photograph of the highlight portion of the object, as in the above cases, the light-measurement is based upon all of the luminances of the sub-areas 102A, 102B and the light-measurement value $V_1-V_2$ is found, using the zero compensating coefficient, by the following arithmetic equation:

$$V_1-V_2=(V_A+V_B)/2 \quad (7)$$

Referring to the operation of the circuits, the comparators 150 and 158 produce H level outputs, while the comparators 152, 153 and 157 produce L level outputs, and the AND gate 169 produces H level output, while the other AND gates 162-168, 170 produce L level outputs. Accordingly the gate circuit 171 receives the outputs of the comparator 150 and the AND gates 162–170 and provides the output signal 171*i* at H level and the output signals 171*a*–171*h* at L level. The output of the operational amplifier 128 is voltage $(V_A+V_B)/2$ and the output $V_1-V_2$ of the operational amplifier 33 is voltage $(V_A+V_B)/2$.

(1-8)
It is assumed that $$\begin{pmatrix} \Delta_{BA} < V_{P2} \\ V_{Q1} < \Delta_{CB} \end{pmatrix}$$

Specifically, as shown in FIG. 15(*h*), the luminance signal difference $\Delta_{BA}$ between the luminance of the sub-area 102A and that of the sub-area 102B is a negative number having an absolute value larger than the predetermined value $V_{P2}$ and the luminance signal difference $\Delta_{CB}$ between the luminance of the sub-area 102B and that of the peripheral area 102C is larger than the predetermined value $V_{Q1}$.

In this case, it can be judged that the main object has a similar size as that described in the above case (1-1) and has a substantial difference in luminance between portions of the same and the sub-area 102A has slightly high luminance. The light-measurement is effected on the basis of the luminances of the sub-areas 102A and 102B as in the case of the above (1-1) and the light-measurement value is found, using zero compensating coefficient, by the following arithmetic equation:

$$V_1-V_2=(V_A+V_B)/2 \tag{8}$$

referring to the operatron of the circuits, the comparators 150, 157 and 158 produce H level outputs, while the comparators 152 and 153 produce L level outputs, and the AND gate 168 produces H level output while the other AND gates 162–167, 169, 170 produce L level outputs. Accordingly the gate circuit 171 receives the outputs of the comparator 150 and the AND gates 162–170 and provides the output signal 171*i* at H level and the output signals 171*a*–171*h* at L level. The output of the operational amplifier 128 is voltage $(V_A+V_B)/2$ and the output $V_1-V_2$ of the operational amplifier 133 is voltage $(V_A+V_B)/2$.

(1-9)
It is assumed that $$\begin{pmatrix} V_{P2} < \Delta_{BA} < V_{P1} \\ V_{Q2} < \Delta_{CB} < V_{Q1} \end{pmatrix}$$

Specifically, as shown in FIG. 15(*i*), the luminance signal difference $\Delta_{BA}$ between the sub-area 102A and the sub-area 102B is small and the luminance signal difference $\Delta_{CB}$ between the sub-area 102B and the peripheral area 102 is also small. In this case it is judged that the main object occupies whole area of the field to be photographed or the luminance of the main object and that of the background are at substantially same level. In this case, the light-measurement is based on the luminances of the sub-areas 102A and 102B and the light-measurement value is found, using zero compensating coefficient, by the following arithmetic equation:

$$V_1-V_2=(V_A+V_B)/2 \tag{9}$$

Referring to the operation of the circuits, the comparators 150, 153 and 158 produce H level outputs, while the comparators 152 and 157 produce L level outputs, and the AND gate 166 produces H level output while the other AND gates 162–165, 167–170 produce L level outputs. Accordingly the gate circuit 171 receives the outputs of the comparator 150 and the AND gates 162–170 and provides the output signal 171*i* at H level and the output signals 171*a*–171*h* at L level. The output of the operational amplifier 128 is voltage $(V_A+V_B)/2$ and the output $V_1-V_2$ of the operational amplifier 133 is voltage $(V_A+V_B)/2$.

(2) It is assumed that the luminance signal $V_C$ obtained from the peripheral area 102C of the field to be photographed 106 as shown in FIG. 6 is smaller than the reference voltage $V_{r0}$, that is, $V_C<V_{r0}$, and that the field to be photographed was judged to be an indoor field which includes a wall of room in its background. In this case, the reference voltages $V_{P3}$, $V_{P4}$, $V_{Q3}$ and $V_{Q4}$ (the interrelation between these voltages is: $V_{P4}<-0<V_{P3},<0<V_{Q3}$) are used as constants, depending upon the values of the luminance signal difference $\Delta_{BA}$ and the luminance signal difference $\Delta_{CB}$ and the value of light-measurement $V_1-V_2$ is found by the following operations, in the same manner as in the case of (1).

(2-1)
It is assumed that $$\begin{pmatrix} V_{P4} < \Delta_{BA} < V_{P3} \\ V_Q < \Delta_{CB} \end{pmatrix}$$

Specifically, as shown in FIG. 16(*a*), the luminance signal difference $\Delta_{BA}$ between the sub-area 102A and the sub-area 102B is decresed, while the luminance signal difference $\Delta_{CB}$ between the sub-area 102B and the peripheral area 102C is larger than the predetermined value $V_{Q3}$. In this case, it can be judged that the main object exists both in the sub-area 102A and the sub-area 102B and it is large and dark. Accordingly, the light-measurement may be based on the luminances of sub-areas 102A and 102B and the light-measurement value may be found, using zero compensating coefficient. However, it is preferable to surely obtain a photograph of a dark object in black color (shadow control). In the embodiment, in order to provide a better exposure value, to express shadow portion of the object to be photographed, the light-measurement is based on the luminances of the sub-areas 102A and 102B and the light-measurement value is determined, using the compensating coefficient of $V_{r7}$ at the side, by the following arithmetic equation:

$$V_1-V_2=(V_A+V_B)/2 - V_{r7} \tag{10}$$

The operation of the circuits will be described. The luminance signal (voltage) $V_C$ of the peripheral area 102C is smaller than the reference signal $V_{r0}$, so that the comparator 150 provides L level output, and consequently L level signal is fed to the control terminal B/$\overline{D}$ of the reference voltage generating circuit 151. The reference voltages of said circuit 151 are $V_{Pa}=V_{P3}$, $V_{Pb}=V_{P4}$, $V_{Qa}=V_{Q3}$, $V_{Qb}=V_{Q4}$. On the other hand, the comparators 150 and 152 produce L level outputs, while the comparators 153, 157 and 158 produce H level outputs, and the AND gate 165 produces H level output, while the other AND gates 162–164, 166–170 produce L level outputs. Accordingly the gate circuit 171 receives the outputs of the comparator 150 and the AND gates 162-170 and provides the output signal 171g at H level and the output signals 171a-171f, 171h, 171i at L level. The output of the operational amplifier 128 is voltage $(V_A+V_B)/2$ and the output $V_1-V_2$ of the operational amplifier 133 is voltage $(V_A+V_B)/2-V_{r7}$.

(2-2)
It is assumed that $$\begin{pmatrix} V_{P3} < \Delta_{BA} \\ V_{Q3} < \Delta_{CB} \end{pmatrix}$$

Specifically, as shown in FIG. 16(b), the luminance signal difference $\Delta_{BA}$ between the sub-area 102A and the sub-area 102B is larger than the predetermined value VP3 and the luminance signal difference $\Delta_{CB}$ between the sub-area 102B and the peripheral area 102C is also larger than the predetermined value $V_{Q3}$. In this case, it can be judged that the main object exists in whole area of the sub-area 102A and a part of the sub-area 102B and it is dark. In the same manner as in the case of the above (2-1), in order to provide a better exposure value, to express shadow portion of the object to be photographed, the light-measurement is based on the luminances of the sub-areas 102A and 102B and the light-measurement value is determined, using the compensating coefficient of $V_{r8}$ at the — side ($|V_{r8}|<|V_{R7}|$), by the following arithmetic equation:

$$V_1-V_2=(V_A+V_B)/2-V_{r8} \qquad (11)$$

Referring to the operation of the circuits, the comparators 150 produces L level output, while all of the comparators 152-158 produce H level outputs, and the AND gate 162 produces H level output, while the other AND gates 163-170, produce L level outputs. Accordingly the gate circuit 171 receives the outputs of the comparator 150 and the AND gates 162-170 and provides the output signal 171h at H level and the output signals 171a-171g, 171i at L level. The output of the operational amplifier 128 is voltage $(V_A+V_B)/2$ and the output $V_1-V_2$ of the operational amplifier 133 is voltage $(V_A+V_B)/2-V_{r8}$.

(2-3)
It is assumed that $$\begin{pmatrix} V_{P3} < \Delta_{BA} \\ V_{Q4} < \Delta_{CB} < V_{Q3} \end{pmatrix}$$

Specifically, as shown in FIG. 16(c), the luminance signal difference $\Delta_{BA}$ between the sub-area 102A and the sub-area 102B is larger than the predetermined value $V_{P3}$ and the luminance signal difference $\Delta_{CB}$ between the sub-area 102B and the peripheral area 102C is small. In this case, it can be judged that the main object exists in whole area of the sub-area 102A or the main object is small and dark. In this case, in order to provide a better exposure value, to express shadow portion of the object to be photographed, the light-measurement is based on the luminances of the sub-areas 102A and 102B and the light-measurement value is determined, using zero compensating coefficient, by the following arithmetic equation:

$$V_1-V_2=(V_A+V_B)/2 \qquad (12)$$

Referring to the operation of the circuits, the comparators 150 and 157 produce L level outputs, while the comparators 152, 153, 158 produce H level outputs, and the AND gate 163 produces H level output, while the other AND gates 162, 164-170 produce L level outputs. Accordingly the gate circuit 171 receives the outputs of the comparator 150 and the AND gates 162-170 and provides the output signal 171i at H level and the output signals 171a-171h at L level. The output of the operational amplifier 128 is voltage $(V_A+V_B)/2$ and the output $V_1-V_2$ of the operational amplifier 133 is voltage $(V_A+V_B)/2$.

(2-4)
It is assumed that $$\begin{pmatrix} V_{P3} < \Delta_{BA} \\ \Delta_{CB} < V_{Q4} \end{pmatrix}$$

Specifically, as shown in FIG. 16(d), the luminance signal difference $\Delta_{BA}$ between the sub-area 102A and the sub-area 102B is larger than the predetermined value VP3 and the luminance signal difference $\Delta_{CB}$ between the sub-area 102B and the peripheral area 102C is a negative number having an absolute value larger than the predetermined value $V_{Q4}$. In this case, it can be judged that the main object to be photographed is a usual object having substantially same size as that described in the above case (2-3) and including a highly luminant object (for example, electric lamp) in the sub-area 102B, or that the sub-area 102A has slightly low luminance. In can be concluded from data that a highly luminant object in the sub-area 102B in the case of indoor photographing has lower influence than a highly luminant object (for example, sun) in the sub-area 102B in the case of outdoor photographing. Accordingly, the decision of the light-measurement value $V_1-V_2$ is based upon the luminances of the sub-areas 102A and 102B and the value $V_1-V_2$ is determined, using zero compensating coefficient, by the following arithmetic equation:

$$V_1-V_2=(V_A+V_B)/2 \qquad (13)$$

Referring to the operation of the circuits, the comparators 150, 157 and 158 produce L level outputs, while the comparators 152 and 153 produce H level outputs, and the AND gate 164 produces H level output, while the other AND gates 162, 163, 165-170 produce L level outputs. Accordingly the gate circuit 171 receives the outputs of the comparator 150 and the AND gates 162-170 and provides the output signal 171i at H level and the output signals 171a-171h at L level. The output of the operational amplifier 128 is voltage $(V_A+V_B)/2$ and the output $V_1-V_2$ of the operational amplifier 133 is voltage $(V_A+V_B)/2$.

(2-5)
It is assumed that $$\begin{pmatrix} V_{P4} < \Delta_{BA} < V_{P3} \\ \Delta_{CB} < V_{Q4} \end{pmatrix}$$

Specifically, as shown in FIG. 16(e), the luminance signal difference $\Delta_{BA}$ between the sub-area 102A and the sub-area 102B is small and the luminance signal difference $\Delta_{CB}$ between the sub-area 102B and ( the peripheral area 102C is negative number having absolute value larger than the predetermined value $V_{Q4}$. In this case, it can be judged that the main object exists in both of the sub-areas 102A and 102B and only these sub-areas 102A and 102B are illuminated with light. In this case, some consideration is given to the part of the main object having relatively high luminance and the light-measurement value $V_1-V_2$ is determined, on the basis of the luminances of the sub-areas 102A and 102B by the following equation, using zero compensating coefficient:

$$V_1-V_2=(V_A+V_B)/2 \quad (14)$$

Referring to the operation of the circuits, the comparators 150, 152, 157 and 158 produce L level outputs, while the comparator 153 produces H level output, and the AND gate 167 produces H level output, while the other AND gates 162-166, 168-170 produce L level outputs. Accordingly the gate circuit 171 receives the outputs of the comparator 150 and the AND gates 162-170 and provides the output signal 171$i$ at H level and the output signals 171$a$-171$h$ at L level. The output of the operational amplifier 128 is voltage $(V_A+V_B)/2$ and the output $V_1-V_2$ of the operational amplifier 133 is voltage $(V_A+V_B)/2$.

(2-6)
It is assumed that $$\begin{pmatrix} \Delta_{BA} < V_{P4} \\ \Delta_{CB} < V_{Q4} \end{pmatrix}$$

Specifically, as shown in FIG. 16(*f*), the luminance signal difference $\Delta_{BA}$ between the sub-area 102A and the sub-area 102B is a negative number having an absolute value larger than the predetermined value VP4 and the luminance signal difference $\Delta_{CB}$ between the sub-area 102B and the peripheral area 102C is also a negative number having an absolute value larger than that of the predetermined value $V_{Q4}$. In this case it is judged that the main object exists in whole area of the sub-area 102A and a part of the sub-area 102B and the whole of the sub-area 102A and the part of the sub-area 102B are illuminated with light. In this case, it is necessary to make compensation by compensating coefficient in order to provide a proper exposure to the object, as compared with the above case (2-5). Accordingly, the light-measurement is effected on the basis of the luminances of the sub-areas 102A and 102B and the light-measurement value $V_1-V_2$ is determined by the following equation, using the compensating coefficient $V_{r6}$ at the − side.

$$V_1-V_2=(V_A+V_B)/2-V_{r6} \quad (15)$$

Referring to the operation of the circuits, all of the comparators 150-158 produce L level outputs, and the AND gate 170 produces H level output, while the other AND gates 162-169 produce L level outputs. Accordingly the gate circuit 171 receives the outputs of the comparator 150 and the AND gates 162-170 and provides the output signal 171$f$ at H level and the output signals 171$a$-171$e$, 171$g$-171$i$ at L level. The output of the operational amplifier 128 is voltage $(V_A+V_B)/2$ and the output $V_1-V_2$ of the operational amplifier 133 is voltage $(V_A+V_B)/2-V_{r6}$.

(2-7)
It is assumed that $$\begin{pmatrix} \Delta_{BA} < V_{P4} \\ V_{Q4} < \Delta_{CB} < V_{Q3} \end{pmatrix}$$

Specifically, as shown in FIG. 16(*g*), the luminance signal difference $\Delta_{BA}$ between the sub-area 102A and the sub-area 102B is a negative number having an absolute value larger than the predetermined value $V_{P4}$ and the luminance signal difference $\Delta_{CB}$ between the sub-area 102B and the peripheral area 102C is small. In this case it is judged that the main object exists in whole area of the sub-area 102A or the main object is small and exists in a part of the sub-area 102A. In this case, in order to provide a proper exposure to the object, the light-measurement is effected on the basis of the luminances of the sub-areas 102A and 102B and the light-measurement value $V_1-V_2$ is determined by the following equation, using the compensating coefficient $V_{r5}(|V_{r5}| > |V_{r6}|)$.

$$V_1-V_2=(V_A+V_B)/2-V_{r5} \quad (16)$$

Referring to the operation of the circuits, the comparators 150, 152, 153 and 157 produce L level outputs, while the comparators 158 produces H level output, and the AND gate 169 produces H level output, while the other AND gates 162-168, 170 produce L level outputs. Accordingly the gate circuit 171 receives the outputs of the comparator 150 and the AND gates 160-162 and provides the output signal 171$e$ at H level and the output signals 171$a$-171$d$, 171$f$-171$i$ at L level. The output of the operational amplifier 128 is voltage $(V_A+V_B)/2$ and the output $V_1-V_2$ of the operational amplifier 133 is voltage $(V_A+V_B)/2-V_{r5}$.

(2-8)
It is assumed that $$\begin{pmatrix} \Delta_{BA} < V_{P4} \\ V_{Q3} < \Delta_{CB} \end{pmatrix}$$

Specifically, as shown in FIG. 16(*f*), the luminance signal difference $\Delta_{BA}$ between the sub-area 102A and the sub-area 102B is a negative number having an absolute value larger than the predetermined value $V_{P4}$ and the luminance signal difference $\Delta_{CB}$ between the sub-area 102B and the peripheral area 102C is larger than the predetermined value $V_{Q3}$.

In this case it is judged that the main object has substantially same size as in the above case (2-1) and includes light and dark portions, particularly low luminance portion in the sub-area 102B and it is a blackish object as a whole. In this case, the light-measurement is effected on the basis of the luminances of the sub-areas 102A and 102B and the light-measurement value $V_1-V_2$ is determined by the following equation, using the compensatng coefficient $V_{r5}$ at the side:

$$V_1-V_2=(V_A+V_B)/2-V_{r5} \quad (17)$$

Referring to the operation of the circuits, the comparators 150-153 produce L level outputs, while the comparators 157, 158 produce H level outputs, and the AND gate 168 produces H level output, while the other AND gates 162-167, 169, 170 produce L level outputs. Accordingly the gate circuit 171 receives the outputs of the comparator 150 and the AND gates 162-170 and provides the output signal 171e at H level 171a–171d, 171f–171i at L level. The output of the operational amplifier 128 is voltage $(V_A+V_B)/2$ and the output $V_1-V_2$ of the operational amplifier 133 is voltage $(V_A+V_B)/2-V_{rS}$.

(2-9)

It is assumed that $$\begin{pmatrix} V_{P4} < \Delta_{BA} < V_{P3} \\ V_{Q4} < \Delta_{CB} < V_{Q3} \end{pmatrix}$$

Specifically, as shown in FIG. 16(i), the luminance signal difference $\Delta_{BA}$ between the sub-area 102A and the sub-are 102B is small and the luminance signal difference $\Delta_{CB}$ between the sub-area 102B and the peripheral area 102C is also small. In this case it is judged that the main object occupies whole area of the field to be photographed or there is no luminance difference between the main object and the background. The light-measurement is effected on the basis of the luminances of the sub-areas 102A and 102B in order to provide a proper exposure to these areas, and the lightmeasurement value $V_1-V_2$ is determined by the following equation, using zero compensating coefficient.

$$V_1-V_2=(V_A+V_B)/2 \tag{18}$$

Referring to the operation of the circuits, the comparators 150, 152 and 157 produce L level outputs, while the comparators 153, 158 produce H level outputs, and the AND gate 166 produces H level output, while the other AND gates 162–165, 167–170 produce L level outputs. Accordingly the gate circuit 171 receives the outputs of the comparator 150 and the AND gates 162–170 and provides the output signal 171i at H level and the output signals 171a–171h at L level. The output of the operational amplifier 128 is voltage $(V_A+V_B)/2$ and the output $V_1-V_2$ of the operational amplifier 133 is voltage $(V_A+V_B)/2$.

(III) Manual Mode

The manual mode means a focus adjusting mode in which the photographer manually operates the focus adjusting means, without using the automatic focus control mechanism. According to the manual mode, the position of a main object in a photographed picture is determined by the photographer's intention. That is, the manual mode is a preliminary mode for a special photographing which the photographer exert his ingenuity in preparing a picture.

Accordingly, in the case of the manual mode the main object is not always positioned at the central area of the photographed picture and, therefore, it is not possible to pay special attention to the central area. Furthermore, it is rather preferred to find the light-measurement value by the arithmetic operation, while attaching equal inportance to the luminance information of the peripheral area and that of the central area of the picture plane.

When the manual mode was selected, L level voltage is applied to the A/$\overline{S}$ input end of the selecting circuit 121 while H level voltage is applied to the M/$\overline{P}$ input end thereof in FIG. 7, and L level voltage is applied to the a/$\overline{s}$ input end of the gate circuit 171, while H level voltage is applied to the m/$\overline{p}$ input end thereof in FIG. 9. Accordingly, the output level of the c/$\overline{q}$ output end is L level while the output level of f/$\overline{e}$ output end is H level, in FIG. 10. Referring to the output signals 171a–171i, only the output signal 171i has H level, while all of the other output signals 171a–171h have L level.

Accordingly, the output voltage $V_1$ of the average value circuit or weighting average value circuit is $(V_A+V_B+KV_C)/(K+2)$ and the output voltage $V_2$ at the $O_2$ output end of the selecting circuit 121 is 0V. That is, the light-measurement output $V_1-V_2$ in the manual mode is alway $(V_A+V_B+KV_C)/(K+2)$.

The characteristic feature of the third embodiment of the light measuring device as explained above resides in the following fact.

Firstly, it is assumed that the one-shot mode wa selected. Supposing that the light-measurement is effected when the main object is positioned at the central portion of the picture at the time of focussing operation, it is possible to make judgement of the size of the main object and then select a arithmetic equation using only the luminance information concerning the central area of the picture or an arithmetic equation using all of the luminance informations concerning the whole area of the picture, according to the size of the main object. It is possible to make compensation for highlight photographing (highlight control) or shadow photographing (shadow control), that is, when it is detected that the object is whitish the compensation is made to take a photograph of a whitish object in intentionally white color or when it is detected that the object is blackish the compensation is made to take a photograph of a blackish object in intentionally black color. This compensation is made so that the amount of compensation is changed according to the detected size of the main object and, consequently, very effective control ot the light-measurement value can be effected.

Secondly, it is assumed that the servo control was selected. It is supposed that a clear main object exists at the central area of the picture. In this case, the luminance informations of the whole picture plane cannot be wholly employed, as in the case of the one-shot mode and, therefore, the arithmetic equation based on only the luminance information of the central area of the picture is selected, so that an exposure is applied to express the object at the central portion of the picture. In this case, it is also possible to detect the whitish or blackish object according to the distribution of the luminance informations over the whole area of the picture. In this case, however, owing to the clear intention of the photographer, the degree of the highlight photographing (highlight control) or shadow photographing (shadow control) is lower than in the case of the one-shot mode. Thus, in the case of the one-shot mode, such arithmetic equation is selected that provides a proper exposure to the central area or whole area of the picture according to the distribution of luminances, while in the case of the servo mode, such arithmetic equation is selected that provides a proper exposure mainly to the central area of the picture. Furthermore, it is necessary, even in a camera having the automatic control mechanism as described in the third embodiment, to provide the manual mode which can reflect the photographer's intention. Accordingly, in the third embodiment there is provided the light measuring system in which when the manual mode was selected average light-measurement is effected on the central area and the peripheral area, so that a proper exposure can be obtained even if the main object does not exist at the central area.

That is, the characteristic feature of the third embodiment resides in the face that it is possible to effect considerably efficient control of the light-measurement value by optimum light-measurement and arithmetic operation according to the characteristics of the respective AF modes.

In the explanation of the embodiment referring to FIGS. 13-16, the values of the luminance levels of the respective areas 102A-102C are indicated as same level when the difference in luminance between the adjoining areas is small. However, it is to be noted that there would be some difference in the actual measurement (the luminance difference is smaller than the predetermined value, such as $V_{P1}$). It is, therefore, to be noted that FIGS. 13-16 are shown, only for the purpose of facilitating the understanding of the invention.

In the above description of the embodiment, the one-shot mode was explained as to two cases, one of which uses two luminance informations of the two sub-areas 102A and 102B of the central portions and the other of which uses all of the luminance informations of the whole areas 102A, 102B and 102C, and the servo mode was explained as to the case in which only two luminance informations of the sub-areas 102A and 102B are used. However, it is possible to use the luminance information of only a part of the central area. Regarding the luminance information of the peripheral area, although the luminance information was found as an average value in the above embodiment, it is possible to find the value and add it into the arithmetic operation.

The present invention is not limited to the application to the single-lens reflex camera but it is equally applied to a lens shutter camera and the like. The embodiments as described above is constructed of logic circuit as the selecting circuit. However, it is, of course, possible to use a microcomputer with software.

As explained above, the third embodiment of the present invention provides a light measuring device in which the arithmetic operation can be varied according to the photographer's intention to be considered on the basis of the selection of the AF modes and automatically provides an exposure corresponding to the photographer's intention.

What is claimed is:

1. A light measuring device, comprising:
   (a) one-shot type focus control means for effecting focus control in a one-shot type focus control mode;
   (b) servo type focus control means for effecting focus control in a servo type focus control mode;
   (c) mode selecting means for selecting said one-shot type focus control mode or said servo type focus control mode;
   (d) a light receiving means in which a field to be photographed is divided into a plurality of areas and measurement of light is effected at the respective areas; and
   (e) light measuring means for measuring a light-measurement value of said field on the basis of light-measurement signals produced by the individual areas of said light receiving means, said light measuring means variably controlling said light-measurement value according to which focus control mode was selected by said mode selecting means.

2. A device according to claim 1, wherein said light measuring means computes the light measurement value of said field by computing a weighted average of light measurement values of said plurality of areas, wherein said light measurement means changes the weight applied to each light measurement value of said plurality of areas according to the focus control mode selected by said mode selecting means.

3. A device according to claim 2, wherein said light measuring means applies more weight to a light measurement value of an area of said first plurality of areas used to measure the distance from the device to said field to be photographed when said mode selecting means selects the servo type focus control mode, as compared with when said mode selecting means selects said one-shot type focus control mode.

4. A device according to claim 1, wherein said light receiving means is divided into a central area for effecting light-measurement of a central portion of said field to be photographed and a plurality of peripheral portions for effecting light-measurement of peripheral portion of said field.

5. A device according to claim 4, wherein said light measuring means applies more weight to a light measurement value of said central area at the time when said servo type focus control mode is selected by selected by said mode selecting means, as compared to the time when said one-shot type focus control mode is selected by said mode selecting means.

6. A light measuring device comprising:
   (a) one-shot type focus control means for effecting focus control in a one-shot focus control mode;
   (b) servo type focus control means for effecting focus control in a servo type focus control mode;
   (c) mode selecting means for selecting said one-shot type focus control mode or said servo type focus control mode;
   (d) a light receiving means in which a field to be photographed is divided into a plurality of areas to form a plurality of light receiving portions for determining the luminance of every area of said plurality of areas;
   (e) computing means for computing a light-measurement value of said plurality of areas based on data representing the luminance of said plurality of areas and an arithmetic equation, wherein said computing means stores a plurality of arithmetic equations therein; and
   (f) arithmetic equation selecting means for selecting one of said arithmetic equations in said computing means according to the selection of the focus control mode affected by said mode selecting means.

7. A device according to claim 6, further comprising a single-lens reflex camera housing said one-shot and servo type focus control means, said mode selecting means, said light receiving means, said computing means, and said arithmetic equation selecting means.

8. A light measuring device, comprising:
   (a) one-shot type focus control means for effecting focus control in a one-shot type focus control mode;
   (b) servo type focus control means for effecting focus control in a servo type focus control mode;
   (c) manually operated focus adjusting means for effecting focus adjustment in a manual focus adjusting mode;
   (d) mode selecting means for selecting said one-shot type focus control mode, said servo type focus control mode, or said manual focus adjusting mode;
   (e) light receiving means in which a field to be photographed is divided into a plurality of areas to form a plurality of light receiving portions for determining the luminance of every area of said plurality of areas; and (f) computing means for computing a light-measurement value of said plurality of areas based on data representing the luminance of said plurality of areas and an arithmetic equation, wherein said computing means stores a plurality of arithmetic equations therein; and (g) arithmetic equation selecting means for selecting one of said arithmetic equations in said computing means according to the selection effected by said mode selecting means.

9. A device according to claim 8, further comprising a single-lens reflex camera housing said one-shot and servo type focus control means, said mode selecting means, said light receiving means, said computing means, and said arithmetic equation selecting means.

10. A light measuring device, comprising:
(a) one-shot type focus control means for effecting focus control in a one-shot type focus control mode;
(b) servo type focus control means for effecting focus control in a servo type focus control mode;
(c) mode selecting means for selecting said one-shot type focus control mor or said servo type focus control mode;
(d) light receiving means, in which a field to be photographed is divided into at least two areas including a central area and an outer peripheral area surrounding said central area and at least said peripheral area is further divided into a plurality of sub-areas, to form a plurality of light receiving portions, for determining the luminance of said central area and all of said plurality of sub-areas;
(e) computing means including mens for storing a first group of arithmetic equations and a second group of arithmetic equations, previously set therein, wherein said computing means computes the light-measurement value of the field to be photographed, wherein said first group relates to the luminance only of said central area and said second group relates to the luminace of both said central area and said sub-areas forming said peripheral area; and
(f) arithmetic equations selection means for variably selecting the arithmetic equation according to the selection effected by said mode selecting means, wherein said arithmetic equation selecting means selects an arithmetic equation out of said first group of arithmetic equations in said computing means, an arithmetic equation out of said second group of arithmetic equations, or an arithmetic equation out of both of said first group and said second group of arithmetic equations.

11. A device according to claim 10, wherein at the time when said one-shot type of focus control mode is selected by said mode selecting means, said arithmetic equation seleciting means selects an arithmetic equation out of both of said first group of arithmetic and said second group of arithmetic equations.

12. A device according to claim 10, wherein at the time when said servo type focus control mode is selected by said mode selecting means, said arithmetic equation selecting means selects an arithmetic equation out of said first group of arithmetic equations.

13. A light measuring device, comprising:
(a) one-shot type focus control means for effecting focus control in a one-shot type focus control mode;
(b) servo type focus control means for effecting focus control in a servo type focus control mode;
(c) manually operated focus adjusting means for effecting focus adjustment in a manual focus adjusting mode;
(d) mode selecting means for selecting said one-shot type focus control mode, said servo type focus control mode, or said manual focus adjusting mode;
(e) light receiving means, in which a field to be photographed is divided into at least two areas including a central area and an outer peripheral area surrounding said central area and at least said peripheral area is further divided into a plurality of sub-areas, to form a plurality of light receiving portions, for determining the luminance of said central area and all of said plurality of sub-areas;
(f) computing means including means for storing a first group of arithmetic equations and a second group of arithmetic equations, previously set therein, wherein said computing means computes the light-measurement value of the field to be photographed, wherein said first group relates to the luminance only of said central area and said second group relates to both the luminance of said central area and said sub-areas forming said peripheral area; and
(g) arithmetic equation selecting means for variably selecting the arithmetic equation according to the selection effected by said mode selecting means, wherein said arithmetic equation selecting means selects an arithmetic equation out of said first group of arithmetic equations in said computing means, an arithmetic equation out of said second group of arithmetic equations, or an arithmetic equation out of both of said first group and said second group of arithmetic equations.

14. A device according to claim 13, wherein at the time when said one-shot type focus control mode is selected by said mode selecting means, said arithmetic equation selecting means selects an arithmetic equation out of both of said first group of arithmetic and said second group of arithmetic equations.

15. A device according to claim 13, wherein at the time when said servo type focus control mode is selected by said mode selecting means, said arithmetic equation selecting means selects an arithmetic equation out of said first group of arithmetic equations.

16. A device according to claim 13, wherein at the time when said manual focus adjusting mode is selected, said arithmetic equation selecting means selects an arithmetic equation out of said second group of arithmetic equations.

17. A light measuring device, comprising:
(a) one-shot type focus control means for effecting focus control in a one-shot type focus control mode;
(b) servo type focus control means for effecting focus control in a servo type focus control mode;
(c) mode selecting means for selecting said one-shot type focus control mode or said servo type focus control mode;
(d) light receiving means in which a field to be photographed is divided into a plurality of areas and the luminance is determined for each area;
(e) computing means including means for storing a group of arithmetic equations, previously set therein, and data representing the luminance of said areas found by said light receiving means, wherein said computing means computes a light-measurement value using one of said equations and said data; and (f) arithmetic equation selecting means for selecting one of said equations out of said group of arithmetic equations in said computing means for use in computing said light measurement value and for varying the range of arithmetic equations to be selected out of said group of arithmetic equations in said computing means, according to the selection effected by said mode selecting means.

18. A device according to claim 17, wherein said light receiving means divides a field to be photographed into at least two areas including a central area and an outer peripheral area outside of said central area.

19. A device according to claim 18, wherein said peripheral area is further divided into a plurality of sub-areas.

20. A device according to claim 19, wherein at the time when said servo type focus control mode is selected by said mode selecting means, said arithmetic equation selecting means limits the range of arithmetic equations to be selected out of said group of arithmetic equations, as compared with the time when said one-shot type focus control mode is selected.

21. A light measuring device, comprising:
(a) one-shot type focus control means for effecting focus control in a one-shot type focus control mode;
(b) servo type focus control means for effecting focus control in a servo type focus control mode;
(c) manually operated focus adjusting means for effecting focus adjustment in a manual focus adjusting mode;
(d) mode selecting means for selecting said one-shot type focus control mode, said servo type focus control mode, or said manual focus adjusting mode;
(e) light receiving means in which a field to be photographed is divided into a plurality of areas and the luminance is determined for each area;
(f) computing means including means for storing a group of arithmetic equations, previously set therein, and data representing the luminance of said areas found by said light receiving means, computing means computes a light-measurement value using one of said equations and said data; and
(g) arithmetic equation selecting means for selecting one of said equations out of said group of arithmetic equations in said computing means for use in computing said light measurements value and for varying the range of arithmetic equations to be selected out of said group of arithmetic equations in said computing means, according to the selection effected by said mode selecting means.

22. A device according to claim 21, wherein said light receiving means divides a field to be photographed into at least two areas including a central area and an outer peripheral area outside of said central area.

23. A device according to claim 22, wherein said peripheral area is further divided into a plurality of sub-areas.

24. A device according to claim 21, wherein at the time when said servo type focus control mode is selected by said mode selecting means, said arithmetic equation selecting means limits the range of arithmetic equations to be selected out of said group of arithmetic equations, as compared with the time when said one-shot type focus control mode is selected.

25. A device according to claim 20, wherein at the time when said servo type focus control mode is selected by said mode selecting means, said arithmetic equation selecting means limits the range of arithmetic equations to be selected out of said group of arithmetic equations, as compared with the time when said manual focus adjusting mode is selected.

26. A light measuring device, comprising:
(a) automatic focus control means for effecting focus adjustment in an automatic focus control mode;
(b) manually operated focus adjusting means for effecting focus adjustment in a manual focus adjusting mode;
(c) mode selecting means for selecting said automatic focus control mode or said manual focus adjusting mode;
(d) light receiving means in which a field to be photographed is divided into a plurality of areas and the luminance is determined for each area;
(e) computing means including means for storing a group of arithmetic equations, previously set therein, and data representing the luminance of said areas found by said light receiving means, wherein said computing means computes a light-measurement value using one of said equations and said data; and
(f) arithmetic equation selecting means for selecting one of said equations out of said group of arithmetic equations in said computing means for use in computing said light measurement value and for varying the range of arithmetic equations to be selected out of said group of arithmetic equations in said computing means, according to the selection effected by said mode selecting means.

27. A device according to claim 25, wherein said light receiving means divides a field to be photographed into at least two areas including a central area and an outer peripheral area outside of said central area.

28. A device according to claim 26, wherein said peripheral area is further divided into a plurality of sub-areas.

* * * * *

UNITED STATES PATENT AND TRADEMARK OFFICE
CERTIFICATE OF CORRECTION

PATENT NO. : 4,774,401

DATED : September 27, 1988

INVENTOR(S) : Akira Yamada, et al.

It is certified that error appears in the above-identified patent and that said Letters Patent is hereby corrected as shown below:

Column 2:

Line 26, "FIG. 1" should read --FIG. 5--.

COLUMN 3:

Line 18, "or" should read --of--.

COLUMN 4:

Line 7, "thrs" should read --this--.

Line 33, "These" should read --The--

COLUMN 5:

Line 22, "Then," should read --Now,--.

Line 26, "respec" should read --respective--.

Line 27, "an" should read --and--.

UNITED STATES PATENT AND TRADEMARK OFFICE
CERTIFICATE OF CORRECTION

PATENT NO. : 4,774,401

DATED : September 27, 1988

INVENTOR(S) : Akira Yamada, et al.

It is certified that error appears in the above-identified patent and that said Letters Patent is hereby corrected as shown below:

COLUMN 7:

Line 13, after "be" should read --effected--.

Line 14, "the" should read --the photographer.--.

Line 47, "102C," should read --$102C_1$,--.

Line 55, "$a_6(>0)$," should read --$a_6(\geq 0)$,--.

COLUMN 8:

Line 62, "27" should read --127--.

Line 65, "th" should read --the--.

COLUMN 9:

Line 1, "$(V_A+V_B+KV_C)(K+2)$." should read

--$(V_A+V_B+KV_C)/(K+2)$.--.

Line 30, "he" should read --the--.

Line 41, "voltage $V_{pa}$," should read --voltage generating circuit, which generates reference voltages $V_{pa}$,--.

Line 43, "or" should read --of--.

Line 57, "amplifier" should read --amplifier 143--.

UNITED STATES PATENT AND TRADEMARK OFFICE
CERTIFICATE OF CORRECTION

PATENT NO. : 4,774,401
DATED : September 27, 1988
INVENTOR(S) : Akira Yamada, et al.

It is certified that error appears in the above-identified patent and that said Letters Patent is hereby corrected as shown below:

COLUMN 10:

Line 9, "$V_{C-VB}$" should read --$V_C-V_B$--.

Lines 37-38, "H level voltage L" should read --H level voltage output while every one of the other AND gates provides L--.

COLUMN 13:

Line 46, "moto" should read --motor--.

Column 14:

Line 14, "224." should read --224--.

Line 39, "1-evel" should read --level--.

COLUMN 15:

Line 2, "the he dires," should read --desired,--.

Line 32, "cas" should read --case--.

Line 64, "rght-" should read --light- --.

UNITED STATES PATENT AND TRADEMARK OFFICE
CERTIFICATE OF CORRECTION

PATENT NO. : 4,774,401  Page 4 of 9
DATED : September 27, 1988
INVENTOR(S) : Akira Yamada, et al.

It is certified that error appears in the above-identified patent and that said Letters Patent is hereby corrected as shown below:

COLUMN 16:

Line 8, "$c/\bar{q}8c$" should read --$c/\bar{q}$--.

Line 59, "$V_1-V_2=(V+V_B)/2$" should read

--$V_1-V_2=(V_A+V_B)/2$--.

COLUMN 17:

Line 37, "$VP_{10}$" should read --$VP_1$--.

Line 56, "15" should read --157--.

Column 19:

Line 11, "$V_1-V_2=(V_A-V_B)/2-V_{r1}$" should read

--$V_1-V_2=(V_A+V_B)/2-V_{r1}$--.

COLUMN 20:

Line 21, "eiists" should read --exists--.

UNITED STATES PATENT AND TRADEMARK OFFICE
CERTIFICATE OF CORRECTION

PATENT NO. : 4,774,401

DATED : September 27, 1988

INVENTOR(S) : Akira Yamada, et al.

It is certified that error appears in the above-identified patent and that said Letters Patent is hereby corrected as shown below:

COLUMN 21:

Line 36, "substially" should read --substantially--.

Line 43, "$V_1-4V_2$," should read --$V_1-V_2$,--.

COLUMN 22:

Line 10, "102" should read --102C--.

Line 32, "$(V_A 30V_B+V_C)/3$" should read --$(V_A+V_B+V_C)/3$--.

COLUMN 23:

Line 55, "$(|V_{r8}|<|V_{R7}|)$," should read --$(|V_{r8}|<|V_{r7}|)$,--

COLUMN 27:

Lines 2-3, "It is assumed that
              Specifically,"

should read --It is assumed that $\begin{vmatrix} \triangle_{BA} < V_{P4} \\ V_{Q3} < \triangle_{CB} \end{vmatrix}$ Specifically,--.

UNITED STATES PATENT AND TRADEMARK OFFICE
CERTIFICATE OF CORRECTION

PATENT NO. : 4,774,401

DATED : September 27, 1988

INVENTOR(S) : Akira Yamada, et al.

It is certified that error appears in the above-identified patent and that said Letters Patent is hereby corrected as shown below:

COLUMN 28:

Line 37, "luminancessignal" should read --luminance signal--.

Line 46, "$V_{P2}<0<F_{P1}$," should read --$V_{P2}<0<V_{P1})$--.

Line 51, "$V_1$-V2" should read --$V_1$-$V_2$--.

Line 63, "sub-are a" should read --sub-area--.

COLUMN 29:

Line 49, "FIG. 150," should read --FIG. 15(b)$_5$--.

Line 54, "sub-are" should read --sub-area--.

COLUMN 30:

Lines 59-60, "$V_{P1} < \triangle_{BA}$
$V_{CB} < \triangle_{Q2}$" should read

--$V_{P1} < \triangle_{BA}$
$V_{CB} < V_{Q2}$--.

COLUMN 31:

Line 9, "upo" should read --upon--.

UNITED STATES PATENT AND TRADEMARK OFFICE
CERTIFICATE OF CORRECTION

PATENT NO. : 4,774,401

DATED : September 27, 1988

INVENTOR(S) : Akira Yamada, et al.

It is certified that error appears in the above-identified patent and that said Letters Patent is hereby corrected as shown below:

COLUMN 33:

Line 5, "33 is" should read --133 is--.

Line 33, "referring" should read --Referring--.

Line 56, "102" should read --102C--.

COLUMN 34:

Line 19, "$0<V_{P3},<0<V_{Q3}$" should read --$0<V_{P3}, V_{Q4}<0<V_{Q3}$--.

COLUMN 35:

Line 15, "VP3" should read --$V_{P3}$--.

Line 27, "$(|V_{r8}|<|V_{R7}|),$" should read --$(|V_{r8}|<|V_{r7}|),$--.

COLUMN 36:

Line 21, "VP3" should read --$V_{P3}$--.

COLUMN 37:

Line 35, "VP4" should read --$V_{P4}$--.

UNITED STATES PATENT AND TRADEMARK OFFICE
CERTIFICATE OF CORRECTION

PATENT NO. : 4,774,401

DATED : September 27, 1988

INVENTOR(S) : Akira Yamada, et al.

It is certified that error appears in the above-identified patent and that said Letters Patent is hereby corrected as shown below:

COLUMN 38:

Line 20, "$(|V_{r5}>|V_{r6}|)$." should read --$(|V_{r5}|>|V_{r6}|)$.--.

Line 58, "the side:" should read --the-side:--.

COLUMN 39:

Line 15, "sub-are" should read --sub-area--.

Lines 22-23, "lightmeasurement" should read --light-measurement--.

COLUMN 40:

Line 10, "wa" should read --was--.

COLUMN 42:

Line 18, "selected by selected by" should read --selected by--.

Line 44, "affected" should read --effected--.

UNITED STATES PATENT AND TRADEMARK OFFICE
CERTIFICATE OF CORRECTION

PATENT NO. : 4,774,401

DATED : September 27, 1988

INVENTOR(S) : Akira Yamada, et al.

It is certified that error appears in the above-identified patent and that said Letters Patent is hereby corrected as shown below:

COLUMN 43:

Line 23, "mor" should read --mode--.

Line 33, "mens" should read --means--.

Line 40, "luminace" should read --luminance--.

Line 42, "equations" should read --equation--.

Line 55, "seleciting" should read --selecting--.

COLUMN 45:

Line 45, "means comput-" should read --means, wherein said comput- --.

Line 51, "measurements" should read --measurement--.

Signed and Sealed this

Thirteenth Day of November, 1990

Attest:

HARRY F. MANBECK, JR.

Attesting Officer

Commissioner of Patents and Trademarks